United States Patent
Ito et al.

(10) Patent No.: US 7,471,415 B2
(45) Date of Patent: Dec. 30, 2008

(54) SYSTEM FOR OFFERING COLOR CONVERSION PROFILE CAPABLE OF COLOR CONVERSION WITH HIGH ACCURACY

(75) Inventors: Takashi Ito, Nagano (JP); Yoshifumi Arai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 924 days.

(21) Appl. No.: 10/826,434

(22) Filed: Apr. 15, 2004

(65) Prior Publication Data

US 2004/0263881 A1    Dec. 30, 2004

(30) Foreign Application Priority Data

Apr. 18, 2003    (JP)    ............................. 2003-114422

(51) Int. Cl.
  *G06F 15/00*    (2006.01)
(52) U.S. Cl. ......................................... 358/1.9; 358/2.1
(58) Field of Classification Search ................. 358/1.9, 358/2.1
  See application file for complete search history.

(56) References Cited

U.S. PATENT DOCUMENTS

2003/0090726 A1 *   5/2003   Arai ........................... 358/2.1
2005/0128495 A1 *   6/2005   Arai ........................... 358/1.9
2005/0174586 A1 *   8/2005   Yoshida et al. ............... 358/1.9

* cited by examiner

*Primary Examiner*—Twyler L. Haskins
*Assistant Examiner*—Michael Burleson
(74) *Attorney, Agent, or Firm*—Martine Penilla & Gencarella, LLP

(57) ABSTRACT

Lattice points for correspondence defining data are determined by transmitting from a client to a server the original correspondence defining data which previously prescribes correspondence between the lattice points in the low-dimensional color space and the lattice points for ink amount for a printing apparatus, causing the server to acquire correspondence between lattice points in the low-dimensional color space and lattice points in the device-independent color space by referencing the original correspondence defining data, prescribing a smoothness evaluation function which evaluates smoothness of the arrangement of lattice points in the device-independent color space and has as a variable the information about the position of lattice points in the low-dimensional color space, and optimizing the arrangement of lattice points in the device-independent color-space by improving the rating of the smoothness evaluation function, with the information about the position of lattice points varied.

8 Claims, 10 Drawing Sheets

SYSTEM FOR OFFERING COLOR CONVERSION PROFILE CAPABLE OF COLOR CONVERSION WITH HIGH ACCURACY

BACKGROUND OF THE INVENTION

1. Field of the Invention

The present invention relates to a system for offering a color conversion profile capable of color conversion with high accuracy, said color conversion profile being used for printing.

2. Description of the Related Art

The image devices such as displays and printers usually employ the color image data which expresses in tone the color of each pixel in term of specific color components. For example, the image data specify colors by means of any of color spaces, such as RGB color space that uses three colors of R (red), G (green), and B (blue), and CMY color space that uses C (cyan), M (magenta), and Y (yellow), including lc (light cyan), lm (light magenta), DY (dark yellow), and K (black). These colors are usually device-dependent colors inherent in individual image devices. One way to permit various image devices to produce identical colors is by color conversion which is performed by means of a profile conforming to the ICC standard.

The ICC profile performs color conversion by using a profile which converts the colors of input image data into the colors of the device-independent color space, a profile which converts the colors of the device-independent color space into the colors of the output image device, and a profile which converts the colors of the output image device into the amount of inks according to the rule governing the use of various inks. The profile which converts the colors of the output image device into the amount of inks according to the rule governing the use of various inks is exemplified by a profile which converts the RGB data equivalent to CMY data into multi-dimensional data such as CMYKlclm data. Preparation of this profile conventionally involves color separation. This color separation is accomplished by prescribing cubic lattice points in the CMY color space and determining lattice points for the components of ink colors such that the three colors of CMY at each lattice point is converted into six colors of CMYKlclm.

The above-mentioned conventional method for determining lattice points does not meet the demand for preparing the profile capable of color conversion with high accuracy at the user level. In other words, the above-mentioned profiles or the profile after color separation are customarily prepared by the printer producer and then transferred to the user's computer when the printer driver is installed. Thus, it was impossible for the user to update them easily. Moreover, although software for preparing the ICC profile is commercially available, it is intended to prepare a profile to convert colors in the device-independent color space into colors for a specific output image device by referencing the profile to convert colors for an output image device into the ink amount conforming to the rule governing the use of various inks. Therefore, it is unable to update the profile to convert colors for an output image device into the ink amount conforming to the rule governing the use of various kinds; therefore, it was difficult to prepare a profile capable of color conversion with high accuracy.

SUMMARY OF THE INVENTION

The present invention was completed in view of the foregoing. It is an object of the present invention to provide a system that permits the user to easily use the profile capable of color conversion with high accuracy.

The system according to the present invention permits a client to send information required to prepare lattice points for the correspondence defining data to a server through a two-way communication line and then permits the server to determine lattice points for the correspondence defining data. To be more specific, the client sends the original correspondence defining data and the server prescribes an evaluation function and optimizes the arrangement of lattice points such that the rating by the evaluation function improves. The evaluation function evaluates smoothness of the arrangement of lattice points in the device-independent color space, with its variable being the information about the position of lattice points in the low-dimensional color space. The resulting arrangement of lattice points has improved smoothness in the device-independent color space.

Lattice points in a color space should be regularly arranged so that they permit accurate interpolation to be performed on colors existing between adjacent lattice points. According to the present invention, this object is achieved if the positions of lattice points are optimized when the correspondence defining data is prepared. In other words, the present invention makes it easy to determine the lattice points for the correspondence defining data which permit accurate interpolation. The client and server prepare the correspondence defining data by using the lattice points for the correspondence defining data, and the client performs color conversion with high accuracy by referencing the thus obtained correspondence defining data. In this way the client can obtain high-quality prints.

According to the present invention, the object for which the arrangement of lattice points is smoothed is the device-independent color space, and the variable is information about the position of lattice points in the low-dimensional color space. Therefore, when the arrangement of lattice points is smoothed and optimized, the amount of ink defined by the original correspondence defining data is not varied directly. In other words, the procedure calculates the amount of ink corresponding to the lattice points specified by the lattice point position information after the lattice point position information has been updated and then associates it with the lattice points in the low-dimensional color space prescribed by the original correspondence defining data; however, the procedure does not change directly the amount of ink per se prescribed by the original correspondence defining data when the amount of ink is calculated. Therefore, the foregoing makes it possible to change highly freely the lattice point position information of the low-dimensional color space and the lattice point in the device-independent color space without being greatly affected by the rule of color separation when the lattice point position information in the low-dimensional color space is updated and the lattice point in the device-independent color space is moved.

Incidentally, when the arrangement of lattice points is smoothed, the amount of ink specified by the original correspondence defining data is not varied directly; however, consideration is given substantially to the rule of color separation when the arrangement of lattice points is smoothed. In other words, the above-mentioned color separation associates the lattice points in the low-dimensional color space, which are prescribed with less color components than the number of inks for each color, with the lattice points for ink amount in the ink amount space, whose components are the amount of ink for each color. This correspondence is the original correspondence defining data. When the client is ready printing, using the ICC profile for color conversion, it is common that the original correspondence defining data has already been installed in the client. In this case the installed one is used as the original correspondence defining data specified in the present invention.

When the smoothness evaluating function is determined, the correspondence between the lattice points in the low-dimensional color space and the lattice points in the device-independent color space is acquired by referencing the original correspondence defining data. This makes it possible to determine the smoothness evaluation function that evaluates smoothness of the arrangement of lattice points in the device-independent color space, with its variable being the lattice point position information of the low-dimensional color space. Therefore, the smoothness evaluation function does not vary the amount of ink but reflects the correspondence prescribed by the original correspondence defining data. Therefore, by improving the rating by the smoothness evaluation function, it is possible to satisfy at the same time the smoothing of the arrangement of lattice points in the device-independent color space and the conformation to the rule of color separation.

The correspondence defining data may be any data that define correspondence between the printing apparatus and the color component value in a color system; for example, it may be an LUT or a so-called profile containing the matrix that prescribes the color relations. The color system mentioned above may be the Lab color space or XYZ color space, which are device independent. (In this specification, the symbol Lab is used for brevity in place of the conventional symbol L*a*b.) It may also include the color space formed by RGB values (used for display) or CMY values. The printing apparatus according to the present invention can use more than three color inks, such as four inks of CMYK or six inks of CMYKlclm or more. The ink combination is not limited to them; a combination of six color inks of CMYKRV is acceptable.

On the other hand, it is only necessary for the original correspondence defining data to prescribe correspondence between the lattice points in a low-dimensional color space that prescribe colors with less color components than the number of inks for each color used by the printing apparatus and the ink amount lattice points in the ink amount space whose components are the amount of inks of each color. The low-dimensional color space may be the RGB color space or the CMY color space, for example. Here, the original correspondence defining data does not need to strictly prescribe correspondence for colors prescribed by each lattice point; therefore, this makes it possible to consider freely the rule of color separation when the original correspondence defining data is previously prepared.

RGB colors and CMY colors are complementary to each other; therefore, when each color is expressed in 256 tones (from 0 to 255), it is possible to assume that C=255−R, M=255−G, and Y=255−B unless a strict agreement among colors is taken into account. Consequently, the RGB color space as the low-dimensional color space is substantially equivalent to the CMY color space as the low-dimensional color space. It is possible to accept various rules to be considered when the original correspondence defining data is previously prepared. One rule may govern how to allocate the combination of CMY colors to CMYKlclm inks at a certain ratio, another rule may limit the amount of inks to be sprayed onto the printing paper, or further another rule may limit the use of K ink to prevent the occurrence of granularity.

The communication means for the client and server is not specifically restricted so long as it can exchange data between them through a two-way communication line. No specific restriction is imposed on its connecting mode and standard; either wire circuit or wireless circuit is acceptable. It is desirable to use the internet in order to offer services to general users; the client-server system may be constructed within a LAN as a matter of course. The users who receive services may be given a password or ID so that they are limited in serves or charged for services.

The smoothness evaluation function may be acceptable so long as it is capable of evaluating smoothness of the arrangement of lattice points in the device-independent color space. Here, smoothness of arrangement implies the degree to which the line of lattice points is distorted in the color space. For example, distortion is null if the lattice points in the device-independent color space are arranged in cubic lattice, but it is large if lattice points are dislocated from the position of cubic lattice points. It can be said that the degree of smoothness is high if lattice points are arranged uniformly in the device-independent color space. It can also be said that the degree of smoothness is low if a curve is described by a high-order function, said curve being drawn between neighboring lattice points in the device-independent color space and from one boundary to the other in the color gamut formed in the device-independent color space.

The smoothness evaluation function should be able to indicate smoothness of the arrangement of lattice points by its value. Making the value to approach an ideal value improves the rating. For example, if the function behaves such that its value decreases as smoothness of the arrangement of lattice points increases, it is possible to optimize the arrangement of lattice points by searching the lattice point position information in the low-dimensional color space that permits the function to takes on a minimal value. This searching may be accomplished in various ways. For example, it is possible to accept various algorithms such as quasi-Newton method and conjugate gradient method.

Moreover, it is not essential for the smoothness evaluation function to contain only the term to evaluate smoothness, or the term which increases as the degree of smoothness decreases. It may also contain other terms that indicate various conditions in addition to the term to evaluate smoothness. For example, it may not be regarded as ideal to make the arrangement of lattice points completely uniform in the color gamut, but it is possible to add a term that permits the state in which lattice points are dense or the intervals of lattice points is nonuniform in a specific region. This can be realized by adding a term which takes on a small value when lattice points are dense or the intervals of lattice points is nonuniform in a specific region.

It is only necessary to be able to acquire from the original correspondence defining data the correspondence between lattice points in the low-dimensional color space and lattice points in the device-independent color space. It is possible to acquire by various methods the correspondence between the lattice points in the low-dimensional color space (specified by the original correspondence defining data) and the ink amount lattice points. For example, it is possible to acquire the color component values corresponding to lattice points in the device-independent color space by carrying out printing with the amount of ink for each color indicated by ink amount lattice points corresponding to lattice points in the low-dimensional color space and then performing colorimetry on the results of printing.

Also, the original correspondence defining data does not strictly prescribe correspondence between actual colors and it is troublesome to perform printing and colorimetry for all the lattice points of the low-dimensional color space (usually about 1000 points) prescribed by the original correspondence defining data. Therefore, it is permissible to perform operation in a simple manner by using an approximation formula. The approximation formula may be one which is based on physical foundation, and it prescribes correspondence between the lattice points in the low-dimensional color space and the lattice points in the device-independent color space, because the present invention is intended to smooth the arrangement of lattice points in the device-independent color space. The procedure is carried out such that if the lattice points in the device-independent color space obtained by the approximation formula are smoothed, then the actual lattices points are also sufficiently smoothed.

The use of the approximation formula may be exemplified by the combination of colorimetry (to be performed only 16 times or so for each ink in this invention) and operation. To be more specific, patches are printed with each ink in single color in order to reduce the number of colors to be measured, and colorimetry is performed on such patches. The resulting colorimetric values are referenced to calculate the color component value of the device-independent color space by approximation. The approximation formula may be an equality which converts the measured value of ink density into the value of RGB brightness components. This operation gives the correspondence between the amount of ink for each color used for patch printing and the RGB brightness.

In this state a correspondence is established between the amount of ink for each color and the RGB brightness; therefore, it is possible to calculate the RGB brightness corresponding to the combination of individual inks. For example, it is possible to calculate the RGB brightness for the combination of arbitrary ink amounts by the abovementioned correspondence, if it is assumed that the RGB brightness for the combination of individual inks is one which is obtained by multiplying the RGB brightness for individual inks by each RGB component, Therefore, interpolation in this stage permits conversion from the combination of ink amounts (prescribed by the original correspondence defining data) into the values of components of RGB brightness. The values of components of RGB brightness can be converted approximately into lattice points in the device-independent color space by the matrix operation (such as any known formula to convert sRGB values into Lab values). In this way the combination of ink amounts (prescribed by the original correspondence defining data) is associated with lattice points in the device-independent color space. This eventually implies that lattice points in the low-dimensional color space are associated with lattice points in the device-independent color space. That is, by referencing the original correspondence defining data once when the evaluation function is prescribed, it is possible to prepare the smoothness evaluation function having as a variable the lattice point position information in the low-dimensional color space, while adding the rule of color separation which is taken into account when the original correspondence defining data is prepared.

The smoothness evaluation function should be one which evaluates smoothness of the arrangement of lattice points in the device-independent color space and which has as a variable the lattice point position information of the low-dimensional color space. However, the function may not be common to all the lattice points to be optimized. For example, the function may have a form which changes from one position to another in the color gamut to which the lattice point to be optimized belongs. In other words, the lattice point to be optimized may or may not be moved freely depending on its position; therefore, the smoothness evaluation function may have a form which varies depending on the position of the lattice point to be optimized. Thus, the smoothness evaluation function can move the lattice point in the most adequate state for individual positions. Here, the lattice point position information may be one which specifies the position of lattice points in the low-dimensional color space, and it may take on various forms. For example, it may be one in which lattice points in the low-dimensional color space are sequentially numbered from those having a small color value and the value of color component between the original lattice points is specified when the number is smaller than a decimal point. Of course, it is also possible to accept one which specifies the position of lattice points by means of RGB data.

There are several methods for evaluating smoothness. A simple method is by using a function which contains the absolute value of the sum of the vectors which are oriented toward the lattice point adjacent to the lattice point to be optimized and which are also oriented in approximately mutually opposite directions. In other words, the sum of the vectors which are directed toward the adjoining lattice point and in approximately mutually opposite directions takes on a value "0" when both vectors have the same magnitude and are oriented in the exactly opposite directions. Therefore, if the smoothness evaluation function is the function that contains the absolute value of the sum, then by minimizing its value, it is possible to bring the lattice point to be optimized close uniformly to their neighboring lattice points and to bring the lattice point to be optimized close to the straight line connecting the neighboring lattice points. In this case, it is possible to improve smoothness of the arrangement of a plurality of lattice points if optimizing operation is performed on a plurality of lattice points to be optimized.

If the lattice points present on the boundary of the color gamut are allowed to move freely when the lattice point to be optimized are optimized, then the lattice points move toward the outside or inside the color gamut. If the lattice point move toward the outside of the color gamut, it is meaningless because that color cannot be output. (Such a lattice point is brought back into the color gamut by gamut mapping mentioned later.) If the lattice point is moved toward the inside of the color gamut, the result is that the range of colors that can originally be expressed by the printing apparatus is narrowed and the ability to express tones by printing is deteriorated. So, it is possible to adopt the function form which varies for each region in the color gamut to which the lattice point to be optimized belongs. This function form is such that when the lattice point to be optimized belongs to the edge line on the boundary of the color gamut, the neighboring lattice points are the lattice points which exist on said edge line and at the opposite sides with respect to the lattice point to be optimized.

The advantage of the foregoing case is that the objects for comparison of smoothness are only the neighboring lattice points on the edge line, and hence the lattice point to be optimized for which the values of the smoothness evaluation function are to be effectively change may be moved in the direction of the edge line and it is easy to move the lattice point to be optimized along the edge line. Therefore, it is possible to easily maintain the size of the color gamut. Of course, it is possible to construct such that the lattice point to be optimized move only along the edge line. That is, in the color system, such as RGB and CMY color systems, which expresses the brightness and density of each color by color component values, at least one of the component values of each color takes on the minimum value or maximum value at the boundary of the color gamut. Therefore, on the edge line of the boundary of the color gamut, two of the color component values take on minimum or maximum values and the other one is variable. Thus, the lattice points can be made to move on the edge line if a prescribed constraint condition is imposed on the lattice point position information as the variable of the smoothness evaluation function, with any one of the color component values left variable and the other color component value fixed.

In addition, the function form which varies for each region in the color gamut to which the lattice point to be optimized belongs may be such that when the lattice point to be optimized belongs to the outer place on the boundary of the color gamut, the adjoining lattice points are the lattice points which exist on the outer plane and also exist at the mutually opposite sides with respect to the lattice point to be optimized. In this case, the objects for comparison of smoothness are only the neighboring lattice points on the outer plane, and hence the lattice point to be optimized for which the values of the smoothness evaluation function are to be effectively varied may be moved along the outer plane and it is easy to move the lattice point to be optimized along the outer plane of the color gamut. Therefore, it is possible to easily maintain the size of the color gamut.

Incidentally, the neighboring lattice points are a set of two lattice points which exist at mutually opposite sides with respect to the lattice point to be optimized, and two sets of such neighboring lattice points (four in total) may be used. In such a case, the lattice point to be optimized may be moved along the outer plane of the color gamut. Of course, it is possible to adopt three sets of neighboring lattice points (six in total). Moreover, it is possible to arrange such that the lattice point to be optimized move only on the outer plane. That is, in the color system, such as RGB and CMY color systems, which expresses the brightness and density of each color by the color component value, at least one of the color component values takes on a minimum or maximum value on the outer plane of the boundary of the color gamut. Thus, the lattice points can be made to move on the outer plane if a prescribed constraint condition is imposed on the lattice point position information as the variable of the smoothness evaluation function, with any two of the color component values left variable and the other color component value fixed.

In addition, the function form which varies for each region in the color gamut to which the lattice point to be optimized belongs may be such that when the lattice point to be optimized belongs to the inside of the boundary of the color gamut, the adjoining lattice points are the lattice points which belong to the inside of the color gamut and also exist at the mutually opposite sides with respect to the lattice point to be optimized. In this case, the objects for comparison of smoothness are the neighboring lattice points which adjoin at the periphery to be optimized. The neighboring lattice points are a set of two lattice points which exist at mutually opposite sides with respect to the lattice point to be optimized, and three sets of such neighboring lattice points (six in total) may be used. In such a case, the lattice point to be optimized may be moved three dimensionally inside the color gamut. Of course, it is possible to adopt more than three sets (six in total) of neighboring lattice points. Incidentally, the lattice point to be optimized is one which is inside the color gamut (or one which exists inside the color gamut excluding the boundary of the color gamut). However, the lattice point on the boundary of the color gamut may be the neighboring lattice point so long as it belongs to the inside of the color gamut.

Once the lattice points for the correspondence defining data have been prepared according to the present invention, the correspondence defining data is prepared based on the lattice points for the correspondence defining data, so that the client can use it. This is accomplished in the following manner. The client receives the lattice points for the correspondence defining data through the two-way communication line and then the client prepares the correspondence defining data. In other words, the client receives data representing lattice points for the correspondence defining data, performs printing with the amount of ink prescribed by the data for lattice points for the correspondence defining data, and performs colorimetry on the results of printing by using a calorimeter. Incidentally, since the color component in the low-dimensional color space is associated with the amount of ink at the lattice points for the correspondence defining data, performing colorimetry on the results of printing with the abovementioned amount of ink is equivalent to performing colorimetry on the results of printing with the value of color components in the low-dimensional color space prescribed by the lattice points for the correspondence defining data.

Colorimetry makes it possible to associate the color component in the low-dimensional color space or the amount of ink with the value of color component in the device-independent color space. If the other color system is the low-dimensional color system, it is possible to constitute the ICC profile from the profile (in which the value of specific color components in the device-independent color space is associated with the value of color component in the low-dimensional color space) and the lattice points for the correspondence defining data (in which the value of color component in the low-dimensional color space is associated with the amount of ink for each color), and the thus obtained profile can be made the correspondence defining data which associates the above-mentioned amount of ink with the value of color component in the other color system.

The correspondence defining data associates the value of color component in the device-independent color space with the value of color component in the color system of the input image. This is accomplished if the amount of ink determined by colorimetry mentioned above is associated with the value of color component in the device-independent color space, the other color system is used as the color system for the input image (such as sRGB), and the color system for the input image and the value of color component in the device-independent color space are converted by any known formulas. In any cases, if the correspondence defining data is prepared and stored in the client, it is possible to perform color conversion with high accuracy in subsequent printing and to obtain high-quality printed products.

Moreover, the system may be modified such that the correspondence defining data is prepared based on the lattice points for the correspondence defining data and the client can use it, or the server prepares the correspondence defining data. In other words, the server prepares the lattice points for the correspondence defining data and then prepares the correspondence defining data in which the amount of ink is associated with the value of color components in the other color system by the ICC profile, or the correspondence defining data in which the value of color component in the device-independent color space is associated with the value of color component in the color system for the input image, and then sends it to the client through the two-way communication line. The client stores the correspondence defining data it has received so as to use it for color conversion with high accuracy in future printing and to obtain high-quality printed products.

The system of the present invention may have only one client so long as the server (which is separate from the client) can prepare the lattice points for the correspondence defining data to be used by the client and the client sends a request for preparation of the lattice points for the correspondence defining data and sends other necessary data. Similarly, the system of the present invention may have only one server so long as the server can receive data from the client and prepare the lattice points for the correspondence defining data.

The system for determining the lattice points for the correspondence defining data carries out processing according to a prescribed procedure; therefore, the present invention may also be embodied as a method for determining the lattice points for the correspondence defining data. The present invention may also be embodied as a program product for determining the lattice points for the correspondence defining data in the sense that the system employs a computer for its execution.

The method and apparatus according to the present invention may be practiced alone or incorporated into another apparatus. The concept of the present invention is not limited to them, but it covers various embodiments and may be modified adequately. The present invention may be practiced in various embodiments, including recording media storing software. The recording media include magnetic recording medium, magneto-optical recording media, or any kind of recording media which will be developed in the future. The software may be in the form of primary or secondary copy.

The software may be provided through communication lines. The present invention may be embodied partly in the form of software and partly in the form of hardware. The software may be stored partly in the storage device and read in according to need. The software may be used in combination with an external program product, so long as it makes the computer to realize the necessary functions.

DESCRIPTION OF THE PREFERRED EMBODIMENTS

Figure 1:
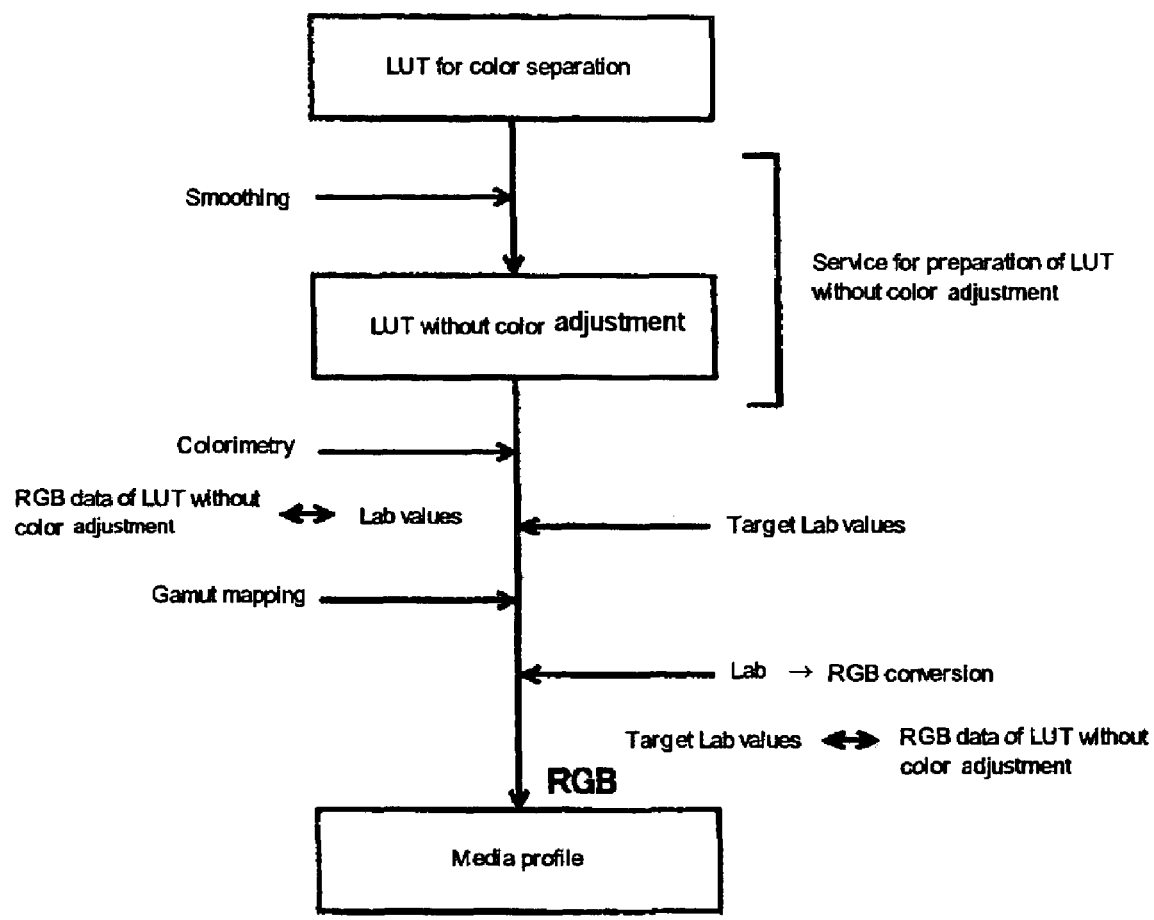
FIG. 1 is a schematic diagram illustrating the steps for preparing the media profile.

The preferred embodiments of the present invention will be described below in the following order.

(1) Outline of service for preparation of no color adjustment LUT.
(2) Constitution of the client.
(3) Constitution of the server and smoothing process.
(4) Optimization by means of evaluation function.
(4-1) Evaluation function $E_1$:
(4-2) Evaluation function $E_2$:
(4-3) Evaluation function $E_3$:
(5) Another embodiment.

(1) Outline of Service for Preparation of No Color Adjustment LUT.

The present invention is designed to offer services to be executed by a remote server when the user wants to improve the accuracy of media profile only with difficulties. According to this embodiment, the server performs the smoothing process by referencing the color-separating LUT. This process needs a large amount of calculation and hence uses computers as the client and server and involves actual printing. Printing should be carried out with a printer which uses the media profile which has been prepared. The half-toning process (HT) mentioned later needs the same algorithm for the half-toning used by the printer.

At the time of printing with a printer, the image data with colors specified by the sRGB values is acquired and the image data is converted into CMYKlclm data which represents colors by combination of the amount of inks of colors specified by the sRGB values. This color conversion may be accomplished in various ways; in this embodiment, color conversion by means of the ICC profile is assumed. That is, the first embodiment shown below is designed to apply the smoothing process according to the present invention to the source profile which converts the sRGB values into the lattice point in the device-independent color space, the media profile which converts the lattice points in the device-independent color space into the RGB values, and the constitution for color conversion by the color-separating LUT which converts the RGB values into the CMYKlclm data.

The media profile usually includes several profiles for different printers, and when a printer driver is installed, all of the media profiles are stored in the hard disc of the computer. However, there is an instance where more highly accurate printing than printing with the previously prepared media profile is necessary. (Such an instance occurs when the printer changes with time in performance, performance varies from one printer to another, and color conversion with particularly high accuracy is required.) The media profile can be prepared automatically by using any known program, and any user who demands highly accurate printing updates the media profile by using this program.

When the media profile is prepared, the color-separating LUT is referenced, and when printing is carried out, the color-separating LUT is also referenced. Consequently, printing with truly high accuracy requires that the color-separating LUT itself is capable of color conversion with high accuracy. According to this embodiment, the client previously registers the color-separating LUT as the DLL (Dynamic Link Library) and sends it to the server, and the server performs the smoothing process by using this color-separating LUT, thereby generating the no color adjustment LUT, and sends it back to the client.

In other words, after the smoothing process by the server, the no color adjustment LUT (which has undergone smoothing) is referenced in place of the color-separating LUT. The no color adjustment LUT is a table which associates RGB data with CMYKlclm data at several reference points. So, the colors specified by them do not strictly agree with each other; however, interpolation that uses these reference points can be carried out with high accuracy over the entire region of the color gamut. Thus, it is possible to prepare the media profile capable of color conversion with high accuracy and to carry out printing after color conversion with high accuracy.

Incidentally, after the smoothing process in this embodiment, the printer converts the lattice points in the device-independent color space into the amount of ink by referencing the media profile and the no color adjustment LUT. Therefore, the media profile and the no color adjustment LUT correspond to the correspondence defining data mentioned above. Also, at the time of smoothing, the no color adjustment LUT is prepared by referencing the color-separating LUT; therefore, the color-separating LUT corresponds to the original correspondence defining data and the no color adjustment LUT corresponds to the lattice points to be referenced to prepare the correspondence defining data.

FIG. 1 is a schematic diagram showing the outline of flow to prepare the no color adjustment LUT and the media profile. According to this embodiment, the color-separating LUT is previously stored in the user's client. This color-separating LUT is prepared by converting the three-dimensional RGB data into six-dimensional CMYKlclm data in conformity with several rules and then associating the thus obtained results.

In other words, one color that is expressed by a combination of six colors of CMYKlclm can be expressed by a combination of different CMYKlclm values, and it is troublesome to univocally determine the CMYKlclm data corresponding to a color represented by RGB data. Therefore, the LUT defines the correspondence between RGB data and CMYKlclm data on the assumption such correspondence conforms to a specific rule. Since the correspondence between RGB data and CMYKlclm data is established according to a specific rule, the color-separating LUT differs from the color-correcting LUT in that the color indicated by the RGB data at the reference point (to be used by the image apparatus) does not always agree with the color indicated by the CMYKlclm data. So, in the case where printing is performed by referencing the color-separating LUT, the media profile is prepared such that the colors obtained by converting the converted RGB values by means of the color-separating LUT agree with the colors which are not yet converted by the media profile, when the lattice points in the device-independent color space are converted into RGB values by means of the media profile.

Incidentally, the RGB data and CMYKlclm data employ the range of tone values which is identical with the range of tone values (usually from 0 to 255) which is used in various image apparatus. Also, since each RGB color is complementary to each CMYK color, it may be assumed that C=255−R, M=255−G, and Y=255−B if it is not necessary to strictly define any color by tone values. In this sense, the RGB data in the color-separating LUT may be the CMY data. The abovementioned specific rule is not limited to only one. The rule provides, for example, that if RGB data is regarded as identical with CMY data, an equal amount a is subtracted from each tone value of CMYK and C=M=Y=a is replaced by the tone value b of K and the remainder of C and M is replaced by lc and lm in a certain ratio. In other words, this rule provides that each tone value of CMY is replaced by each tone value of CMYKlclm which is deemed equivalent.

In addition, since each tone value of CMYKlclm specifies the amount of each color ink to be used, it is determined by considering the condition of limiting inks to be used. This condition limits the amount of ink per unit area below a certain level and also limits the amount of specific inks in order to control ink deposition that affects granularity and appearance (which differs depending on light source). Moreover, the color gamut should be as wide as possible because the image quality is improved with the increasing number of the colors which can be expressed by combination of CMYKlclm inks. These rules play a very important role at the time of printing to be executed by referencing the color-correcting LUT which is eventually prepared. Without these rules, printing will be hampered and high-quality printing will be impossible.

On the other hand, in the color-separating LUT, the arrangement of lattice points has a low degree of smoothness when the color defined by the combination of CMYKlclm data is expressed by the lattice points in the Lab color space. The state in which the arrangement of lattice points has a low degree of smoothness is a state in which a curve is described by a high-order function, said curve connecting adjacent lattice points in the Lab color space and extending from one boundary to the other of the color gamut formed in the Lab color space. When the media profile is prepared, interpolation is used as mentioned later. There are several methods for interpolation, such as linear interpolation and spline interpolation. Any of these methods calculates the color at the lattice point for interpolation from the lattice points existing around the lattice point for interpolation. Therefore, if the arrangement of lattice points has a low degree of smoothness (or the above-mentioned curve is that of a high-order function), the accuracy of interpolation decreases.

As mentioned above, if the accuracy of interpolation is poor, it is impossible to define highly accurately the correspondence between the RGB data defined by the media profile (the object to be prepared eventually) and the CMYKlclm data, and this leads to poor accuracy in color conversion at the time of printing. Moreover, the arrangement of the lattice points represented by CMYKlclm data prescribed by the color-separating LUT is not uniform as a whole in the degree of smoothness. It varies depending on the positions in the Lab color space and the accuracy of interpolation also differs in the color space. This leads to local variation in the accuracy of color conversion. Printing in this state does not give a high-quality image with a smooth color change. This is true particularly in the printing of an image having a continuous color gradation.

Figure 2:
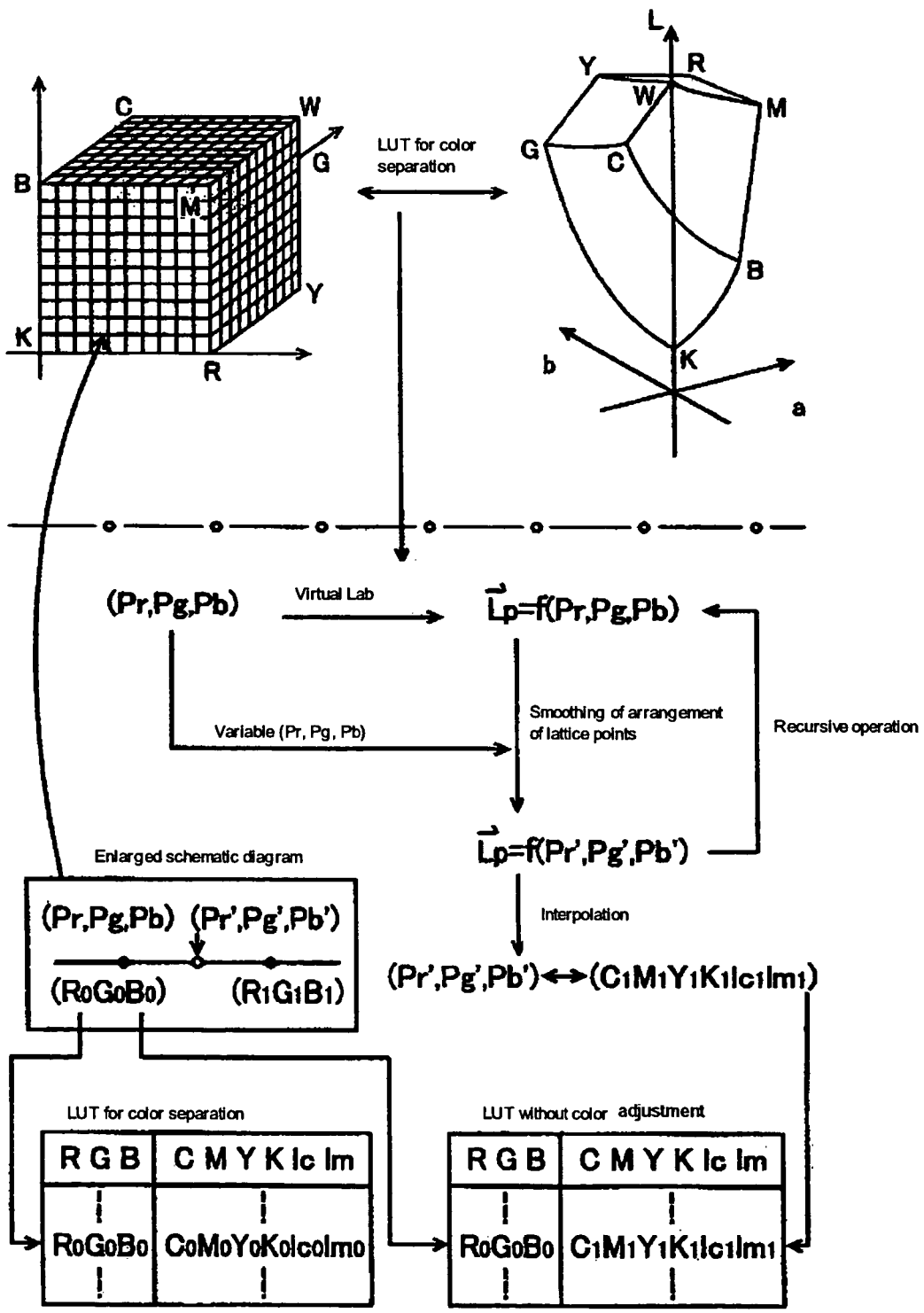
FIG. 2 is a schematic diagram illustrating the smoothing procedure.

Therefore, in this embodiment, the server acquires the color-separating LUT stored in the client, and the server references only the CMYKlclm data prescribed by the color-separating LUT, calculates the CMYKlclm data corresponding to the optimized position of the lattice points, performs smoothing so that the arrangement of lattice points is highly smoothed, and prepares the no color adjustment LUT. FIG. 2 is a schematic diagram showing the smoothing which is performed when the no color adjustment LUT is prepared. The color-separating LUT defines the correspondence between the RGB data and the CMYKlclm data as mentioned above. For the RGB data, the pitch of each RGB color is constant so that their lattice points form a cubic lattice points (as shown in the upper left in FIG. 2) in the orthogonal three-dimensional RGB color space. These cubit lattice points are free of distortion in their arrangement and hence have a high degree of smoothness.

On the other hand, the color gamut defined by CMYKlclm data is distorted in the Lab color space. That is, the upper right part of FIG. 2 shows the color gamut in the Lab color space. As shown in this figure, the color gamut in the Lab color space has a distorted shape. Also, no consideration is given to the arrangement of mutually adjacent lattice points in the color-separating LUT, and the CMYKlclm data is determined in conformity with the abovementioned rules. Therefore, if the color expressed by CMYKlclm data is arranged in the Lab color space, the lattice points are arranged as if there exist lattice points disorderly in the distorted color gamut. In other words, the arrangement of lattice points has a low degree of smoothness.

Consequently, the smoothing process in this embodiment is carried out as follows. The arrangement of lattice points for the color due to the CMYKlclm data defined by the color-separating LUT is smoothed in the virtual Lab color space, and the color-separating LUT in which the arrangement of lattice points has a high degree of smoothness is prepared. (This LUT is referred to as the no color adjustment LUT in this specification.) The lower part of FIG. 2 outlines the procedure to prepare the color-correcting LUT from the color-separating LUT. In this embodiment, the position of the RGB lattice point in the color-separating LUT is specified by the position information (Pr, Pg, Pb), and this position information as a variable is used to represent the lattice point in the virtual Lab color space in terms of vector $L_p$=f(Pr,Pg,Pb). The position information is updated sequentially.

In other words, the position information (Pr, Pg, Pb) is updated sequentially by recursive operation, so that the position of the lattice point represented by vector $L_p$ is adjusted until the position of the lattice point to be adjusted becomes smooth relative to the position of the surrounding lattice points. In this way smoothing is performed on the arrangement of the lattice points in the virtual Lab color space. Incidentally, the position information in this embodiment includes the number of lattice points in the direction of $0 \leq Pr \leq R$ minus 1, the number of lattice points in the direction of $0 \leq Pg \leq G$ minus 1, and the number of lattice points in the direction of $0 \leq Pb \leq B$ minus 1. This position information may be RGB data so long as it can specify the position of the lattice point. However, the RGB data specified in the color-correcting LUT is identical to the RGB data specified by the color-separating LUT, as mentioned later. Therefore, even in this case, the position information is used to update the CMYKlclm data but is not used to update the values of the RGB data prescribed in the color-separating LUT.

Here, the lattice point in the virtual Lab color space has as its components the Lab value which is obtained by performing simple operation on the calorimetric value of a small number of color charts, thereby giving a virtual RGB brightness, and then converting it by a prescribed operational expression. This operation is simple one; but the operational expression is not physically meaningless. Rather, smoothing the arrangement of the lattice point gives the lattice point whose arrangement is sufficiently smoothed even in the actual Lab color space. In other words, the above-mentioned simple operation is one which is obtained by simplifying the Lambert-Beer's law. (Shimpen Shikisai Kagaku Handbook, 2nd edition, issued by Tokyo Daigaku Shuppnkai, p. 222) This operation gives an approximate actual Lab value for CMYKlclm data. So, this Lab value is regarded as the virtual Lab value in this specification.

If the position information (P'r, P'g, P'b) is determined such that it becomes the lattice point whose arrangement has a high degree of smoothness in the virtual Lab color space, then it is possible to prepare the abovementioned no color adjustment LUT by calculating the amount of ink corresponding to the position information (P'r, P'g, P'b) by using the color-separating LUT. The enlarged schematic diagram in FIG. 2 shows the relation between the RGB data and the position information before and after smoothing. In this figure, black circles on the straight line denote the lattice points in the RGB color space, and the RGB data at each lattice point include $R_0$, $G_0$, $B_0$, and $R_1$, $G_1$, $B_1$.

When the lattice point whose RGB data include $R_0$, $G_0$, $B_0$ is the object for smoothing, it is assumed that the position information is (Pr, Pg, Pb) and the position information (P'r, P'g, P'b) indicating the position of lattice point corresponding to the white circle is obtained after smoothing. In this case, this position information specifies the lattice point of white circle, which is surrounded by lattice points associated with the CMYKlclm data that satisfy the above-mentioned rule for color separation. Thus, this data is used for interpolation to calculate the data $C_1M_1Y_1lc_1lm_1$ corresponding to the lattice point indicated by the white circle. Thus, the RGB data ($R_0$, $G_0$, $B_0$) for the lattice point to be smoothed is associated with the CMYKlclm data ($C_1M_1Y_1lc_1lm_1$). The result is the no color adjustment LUT.

The smoothing process mentioned above permits one to calculate the CMYKlclm data corresponding to the position of the lattice point which has been optimized, while referencing only the CMYKlclm data defined by the color-separating LUT, thereby preparing the no color adjustment LUT in which the arrangement of lattice points in the Lab color space has a high degree of smoothness. In other words, the smoothing process is carried out in the virtual Lab color space and its variable is the position information. If it is so constructed that the position information is updated, it is possible to freely move the virtual Lab lattice point without considering the above-mentioned rule for color separation at the time of recursive operation. However, after the lattice point has been optimized, it references the CMYKlclm data defined by the color-separating LUT and calculates the CMYKlclm data corresponding to the position information after optimization.

Therefore, it is possible to acquire the CMYKlclm data after optimization only from the CMYKlclm data which is defined by the color-separating LUT and which satisfies the above-mentioned rule for color separation. That is, when there exist a large number of combinations of CMYKlclm corresponding to a certain color, it is possible to guarantee that the CMYKlclm data after optimization also satisfies the above-mentioned rule for color separation if interpolation is performed by referencing the CMYKlclm data which satisfies the rule for color separation. Incidentally, linear interpolation is desirable because its results do not deviate from the CMYKlclm data that satisfies the rule for color separation. Of course, non-linear interpolation would also roughly satisfy the rule for color separation. As the result, it is possible to perform smoothing while keeping the various rules which were taken into account when the color-separating LUT was prepared, and it is possible to prepare the no color adjustment LUT which satisfies simultaneously both the various rules and the arrangement of lattice points having a high degree of smoothness. The arrangement of lattice points corresponding to the color prescribed by the no color adjustment LUT has a high degree of smoothness in the Lab color space, and consequently it is possible to execute accurate interpolation by referencing the color prescribed by the no color adjustment LUT.

The no color adjustment LUT which has been prepared as mentioned above satisfies the various rules which were taken into account when the above-mentioned color-separating LUT was prepared and also prescribes the reference points that make smooth the arrangement of lattice points; however, it is not always the case that the color (specified by sRGB) having color component values of image data based on RGB data prescribed by the no color adjustment LUT agrees with the color resulting from printing based on the corresponding CMYKlclm data. In other words, this correspondence merely conforms to the above-mentioned rules when the above-mentioned color-separating LUT was prepared, and it is not guaranteed that both colors agree with each other.

So, the user updates the media profile by using the program for profile preparation. In other words, patches are printed to give color charts according to the RGB data prescribed by the no color adjustment LUT, as shown in FIG. 1. In this no color adjustment LUT, the RGB data correspond to the CMYKlclm data and hence printing based on this RGB data is equivalent to printing based on the CMYKlclm data prescribed by the no color adjustment LUT. Once color charts are obtained, colorimetry is performed sequentially on the patches of charts by using a colorimeter. In this way it is possible to acquire the Lab values of patches printed according to RGB data prescribed by the no color adjustment LUT. On the other hand, the sRGB data as the reference points to be registered in the media profile should be previously determined. (In this embodiment, this sRGB data is referred to as target.)

If it is known that a color corresponding to the Lab value takes on a certain value in the RGB color system prescribed in the no color adjustment LUT, then it is possible to prepare the media profile. So, interpolation is carried out by referencing the Lab values of the patches printed according to RGB data prescribed in the no color adjustment LUT and the RGB data corresponding to the Lab values of the color expressed by the sRGB data is acquired. It is the media profile that associates the thus obtained RGB data with the Lab value of the target. Incidentally, in this embodiment, gamut mapping is performed before the Lab values of target are associated with the RGB data in the no color adjustment LUT.

In other words, the Lab value to be converted by the media profile should exist within the color gamut of the printer in the color space; therefore, the Lab value obtained after conversion by the source profile exists within the color gamut of the display. These two color gamuts usually differ from each other. Consequently, color gamut compression is performed on the target Lab so that the Lab value existing outside the color gamut of the printer is converted into the color within the color gamut of the printer when it is to be converted by the media profile, and then the converted value is associated with the RGB data prescribed by the no color adjustment LUT. Of course, various corrections other than gamut mapping may be carried out. For example, color correction may be made such that the corrected color is close to the human's memory color, because the human's memory color differs from the actual color (humans tend to remember the color of the sky and skin more vividly than actual).

With an embodiment in which the smoothing of the present invention is carried out before the profile preparing program is started, it is possible for the server to carry out works which are difficult for the user to accomplish and accurate conversion for the media profile can be made. In other words, smoothing in the present invention is intended to improve the degree of smoothness of the arrangement of lattice points in the device-independent color space; however, if one's attention is paid only to improvement in the degree of smoothness of arrangement, it is possible to carry out smoothing in any stage (as shown in FIG. 1) of preparing the color-correcting LUT. However, if the procedure is modified such that smoothing is carried out when the no color adjustment LUT is prepared and subsequently colorimetry is performed, while executing the profile preparing program, to associate it with the target Lab value, it is possible to establish an accurate correspondence between the target Lab value and the RGB data of the no color adjustment LUT.

In other words, the degree of smoothness of the arrangement of lattice points improves even in the case where smoothing is accomplished in the device-independent color space by means of the Lab values obtained by colorimetry which is performed on color charts obtained before smoothing is carried out based on the RGB data prescribed in the color-separating LUT and the CMYKlclm data. However, the Lab values after smoothing differ in color from the CMYKlclm data of the object for color measurement. Also, even though one attempts to calculate by interpolation the CMYKlclm data corresponding to the Lab value after smoothing, it is impossible to perform accurate interpolation because the neighboring Lab values to be referenced at the time of interpolation are lattice points before smoothing.

Therefore, in any way, the Lab values after smoothing vary in color from the CMYKlclm data prescribed in the color-separating LUT. Even though the media profile is prepared under this condition by associating the Lab values after smoothing with the target Lab values, it is impossible to accurately define the correspondence between the sRGB data defined by the media profile and the CMYKlclm data, and the accuracy for color transformation at the time of printing becomes poor. On the other hand, in the present invention, smoothing is performed in the device-independent color space, the CMYKlclm data corresponding to the optimized position information is acquired by interpolation based on the CMYKlclm data prescribed by the color-separating LUT, the no color adjustment LUT is prepared, and subsequently colorimetry is carried out to associate the RGB data of the no color adjustment LUT (or CMYKlclm data) with the target Lab values.

Consequently, there is no possibility that the color corresponding to the colorimetric value deviates from the color represented by the CMYKlclm data. And, when interpolation is carried out to associate the colorimetric value with the target Lab value, accurate results of interpolation can be obtained because the neighboring Lab values referenced at the time of interpolation are the lattice points after smoothing. As the result, it is possible to prepare the media profile that permits accurate color conversion by smoothing the arrangement of lattice points in the device-independent color space.

(2) Constitution of the Client.

Figure 3:
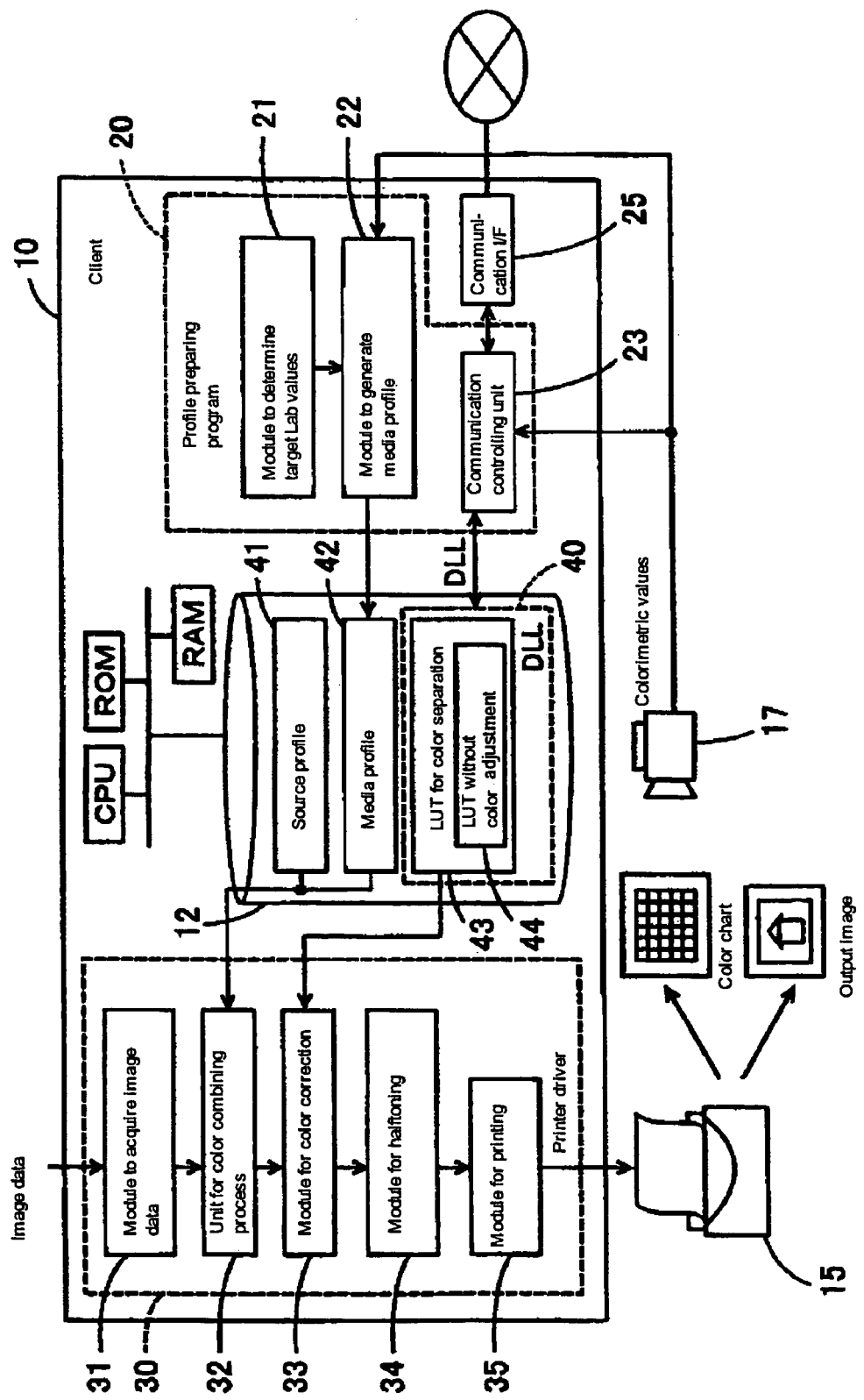
FIG. 3 is a block diagram showing the constitution of the client.

After the smoothing process according to the present invention, the no color adjustment LUT is used by the client which is constructed as explained in the following. FIG. 3 is a block diagram showing the program to be executed by the client 10. The client 10 in this embodiment is a general-purpose PC, which is connected to a printer 15 and a calorimeter 17 through an interface (not shown). The printer 15 carries inks for six colors (CMYKlclm) and records dots for each color on the printing medium. In addition, the client 10 executes the profile preparing grogram 20, the printer driver 30, and other various programs by using CPU, RAM, ROM, etc.

In addition, the client 10 is provided with the hard disc 12, which stores the source profile 41, the media profile 42, and the DLL 40. The DLL 40 has various modules and resources necessary for printing by the printer driver 30. The color-separating LUT is included in it. At the time of image printing, the printer driver 30 selects the source profile 41 corresponding to the RGB color space of the image and the media profile corresponding to the kind of printing medium. It performs color conversion and selects the color-separating LUT 43 according to the medium to be printed and executes printing. In this embodiment, color conversion is performed and printing is performed by referencing the source profile 41 which is previously stored in the hard disc 12 in the initial state (or the state in which the printer driver 30 has been installed) and the media profile 42 and the color-separating LUT 43 which are installed at the same time as the printer driver 30 is installed.

The user who wants to improve the accuracy of color conversion in this state executes the profile preparing program 30 and acquires from the server the no color adjustment LUT 44 which has undergone the smoothing process. The no color adjustment LUT 44 overwrites the color-separating LUT 43 and is stored on the hard disc 12. In this state, the profile preparing program 20 instructs the printer driver 30 to print color charts by using the no color adjustment LUT 44. The printed color charts are examined by the calorimeter 17. The profile preparing program 20 causes the media profile preparing module 22 to prepare the media profile from the correspondence between the colorimetric value and the RGB of the color chart and overwrites it on the hard disc 12. And, the printer driver 30 selects the source profile 41 and the updated media profile 42 and performs color conversion and then selects the no color adjustment LUT 44 and executes printing. Printing performed in this way gives printed products with highly accurate color conversion.

The printer driver 30 has the source profile 41, the media profile 42, and the modules capable of printing by referencing the color-separating LUT 43 and the no color adjustment LUT 44 (or the image data acquiring module 31, the color combination processing unit 32, the color correction module 33, the half-tone processing module 34, and the print processing module 35). The image data acquiring module 31 is a module to acquire the image data which represent the image to be printed. The image data acquiring module 31 executes resolution conversion to match the number of pixels of the acquired image data with the number of pixels necessary for printing when both do not match each other.

The color combination processing unit 32 is a module to reference the source profile 41 and the media profile 42, thereby converting the RGB values of the input image data into the RGB values in the RGB color system prescribed by the color-separating LUT 43 or the RGB values in the RGB color system prescribed by the no color adjustment LUT 44. That is, the source profile 41 is a profile which converts the color system of the input image data into the Lab color system. The color combination processing unit 32 represents the Lab values of the input image data by referencing the source profile 41. The media profile 32 is a profile which converts the Lab color system into the RGB values of the RGB color system prescribed by the color-separating LUT 43 or the RGB values of the RGB color system prescribed by the no color adjustment LUT 44. The color combination processing unit 32 converts the Lab values into the RGB values by referencing the media profile 42. The RGB values are entered into the color correcting module 33.

The color correcting module 33 is a module which performs color conversion by referencing the LUT. It converts the entered RGB values into the CMYKlclm data by referencing the color-separating LUT 43 or the no color adjustment LUT 44. The resulting CMYKlclm data is given to the halftone processing module 34. The half-tone processing module 34 is a module which converts the CMYKlclm tone values of each dot and performs the half-tone process to represent with the recording density of ink drops. It generates the head drive data to make ink adhere in the recording density after conversion. The print processing module 35 receives the head drive data and rearranges them in the order for use by the printer 15.

That is, the printer 15 is provided with a train of ejecting nozzles (not shown) as the ink ejecting device. The nozzle train has a plurality of ejection nozzles arranged in the secondary scanning direction; therefore, data several dots apart in the secondary scanning direction are used at the same time. So, rasterizing is performed to rearrange the order of data such that, of the data arranged in the primary scanning direction, those which are used at the same time are buffered in the printer 15 at the same time. After this rasterizing, the printing module 35 generates printing data (with additional information such as image resolution) and outputs it to the printer 15. The printer 15 prints the image represented by the image data according to the printing data.

In this embodiment, the client 10, which functions as a print controlling apparatus to control the printing of the image data, has the profile preparing program 20. The user who wants highly accurate color conversion activates the profile preparing program 20. The profile preparing program 20 has the module 21 to determine the target Lab values, the media profile generating module 22, and the communication controlling unit 23. The client 10 is connected to the internet through the communication I/F 25, and the communication controlling unit 23 controls the communication I/F 25 to perform transmission and reception.

Figure 4:
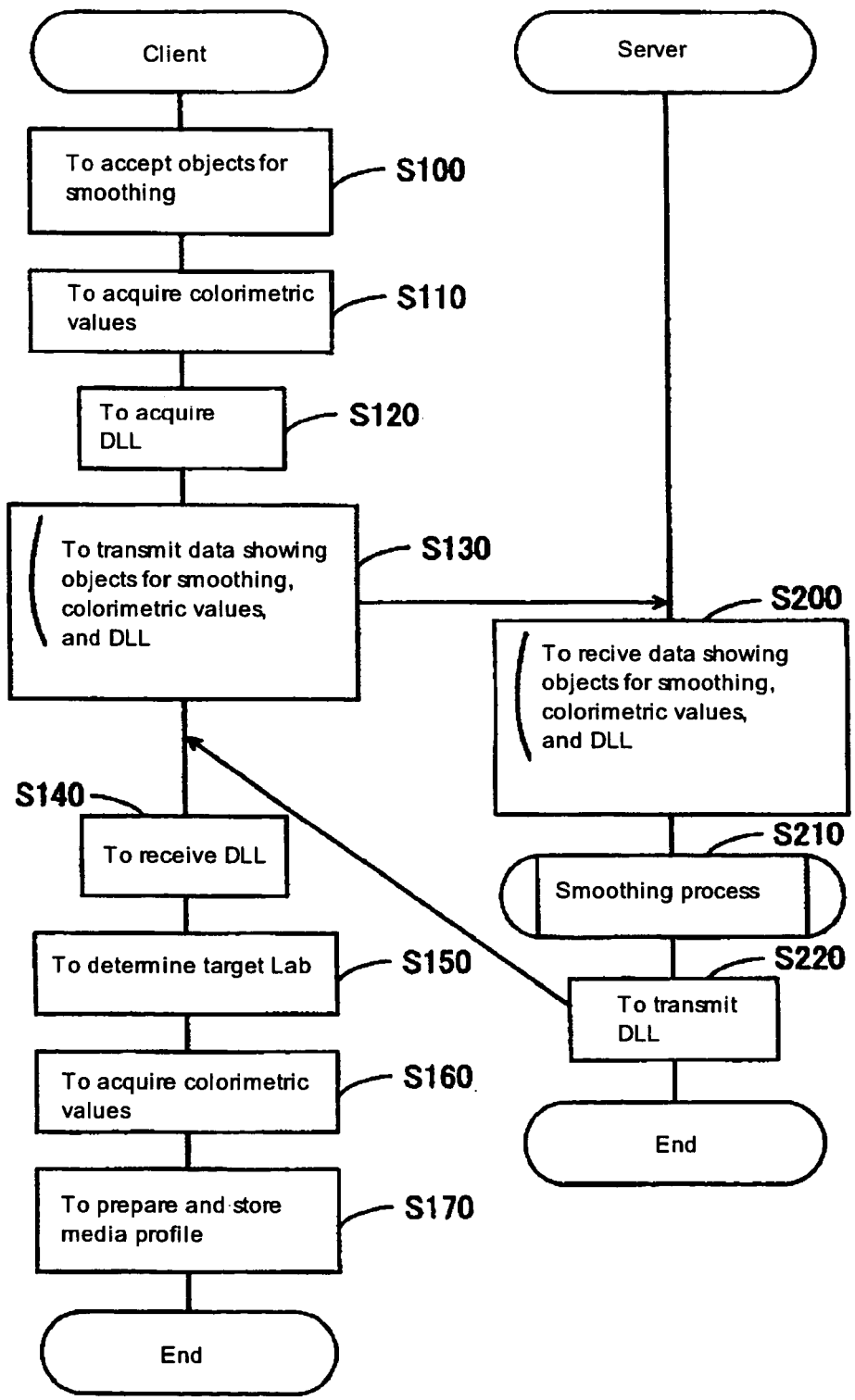
FIG. 4 is a flowchart showing the process for the client and server.

The left side of FIG. 4 shows the process flow of the profile preparing program 20. The communication controlling unit 23 receives through the UI the data that specifies the color-separating LUT 43 to be smoothed, and it transmits the information showing the color-separating LUT 43 to be smoothed and the data necessary for the smoothing process. It also receives the data which has been generated after smoothing. In other words, the DLL 40 includes the color-separating LUT for each printing medium, and the communication controlling unit 23 receives the data that specifies the object of smoothing in Step S100. Also, color charts are printed and colorimetry is performed to give colorimetric values in Step S110.

Here, it extracts about 16-32 gradation values from 256 gradations for each color of each ink color in CMYKlclm and then generates the image data that causes patches to be printed with each single color for the extracted gradation values and then outputs them to the half-tone processing module 34. As the result, 16-32 patches are printed in single color for each color. The calorimeter 17 measures these patches and white paper (not printed with ink) so as to acquire the values of CMY density for each color. The communication controlling unit 23 acquires the data of calorimetric values. Here, if the value of CMY density does not increase or decrease monotonously for the change in gradation of each ink color, it does not converge into the optimal solution in the optimizing process mentioned later but it falls into the extremum solution; therefore, smoothing is carried out beforehand so that the value of CMY density for each color increases or decreases monotonously.

And, the communication controlling unit 23 acquires the data of DLL 40 in Step S120, and transmits to the server the calorimetric values and the data showing the object for smoothing. Based on these data, the server updates the color-separating LUT 45 into the no color adjustment LUT 44 for the DLL 40 and sends the updated DLL 40 back to the client 10. In Step S1430, the communication controlling unit 23 receives the DLL 40 containing the no color adjustment LUT 44 and stores it in the hard disc 12. The data that specifies the object for smoothing may be any data that univocally specifies the object for smoothing; and it includes information that specifies the kind of printer when the server permits smoothing of LUT for several kinds of printers.

The module 21 for determining the target Lab value is a module that determines the target Lab. The module 22 for generating the media profile is a module which performs the processing to prepare the media profile 42 from the no color adjustment LUT 44 by the processing shown in FIG. 1. Upon receipt of the updated DLL 40, the module 21 for determining the target Lab value determines the Lab value of the target in Step S150, and the module 22 for generating the media profile performs colorimetry on the color charts in Step S160. In other words, the module 22 for preparing the media profile prepares the image data of patches with the RGB data prescribed by the no color adjustment LUT 44 and outputs it to the color correcting module 33.

At this time, the color correcting module 33 references the no color adjustment LUT 44, thereby acquiring CMYKlclm data corresponding to each RGB data, and transfers the CMYKlclm data to the half-tone processing module 34. The half-tone processing module 34 and the printing module 35 print patches in response to the CMYKlclm data. As the result, there are obtained color charts printed in response to each RGB data specified in the no color adjustment LUT 44. These color charts are measured for color by the colorimeter 17, and their Lab values are entered into the module 22 for generating the media profile.

The media profile generating module 22 acquires the target Lab value which has been determined by the target Lab value determining module 21. And, in Step S170, it performs gamut mapping and interpolation, thereby calculating the RGB values (RGB data in RGB color system used by the no color adjustment LUT 44) corresponding to the Lab value of the target. It further associates the acquired RGB data with the target Lab value, thereby preparing the media profile 42, and records it on the hard disc 12. After this, the client 10 is ready to perform printing with high accuracy.

(3) Constitution of the Server and Smoothing Process.

Figure 5:
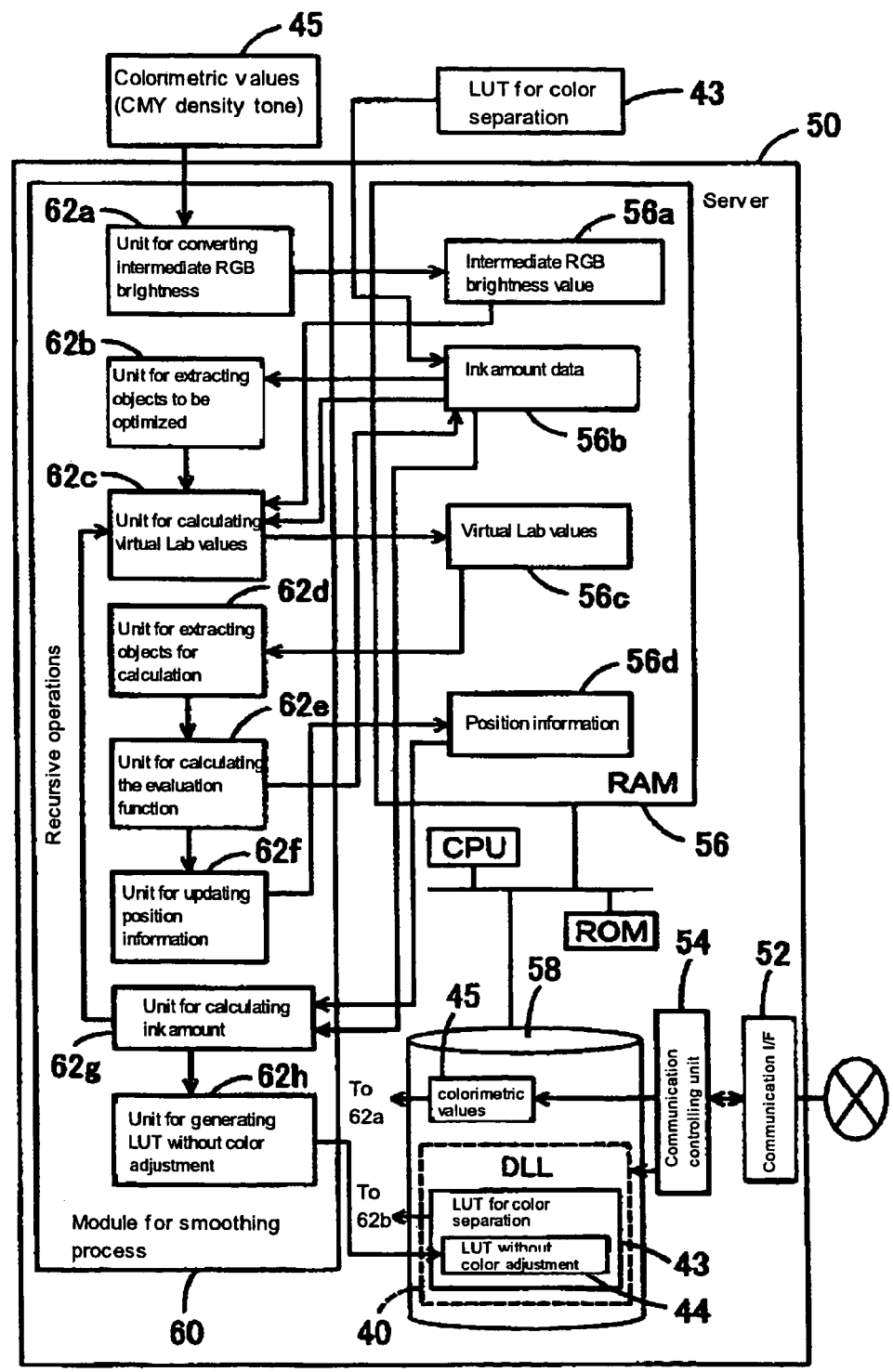
FIG. 5 is a block diagram showing the constitution of the server.
Figure 6:
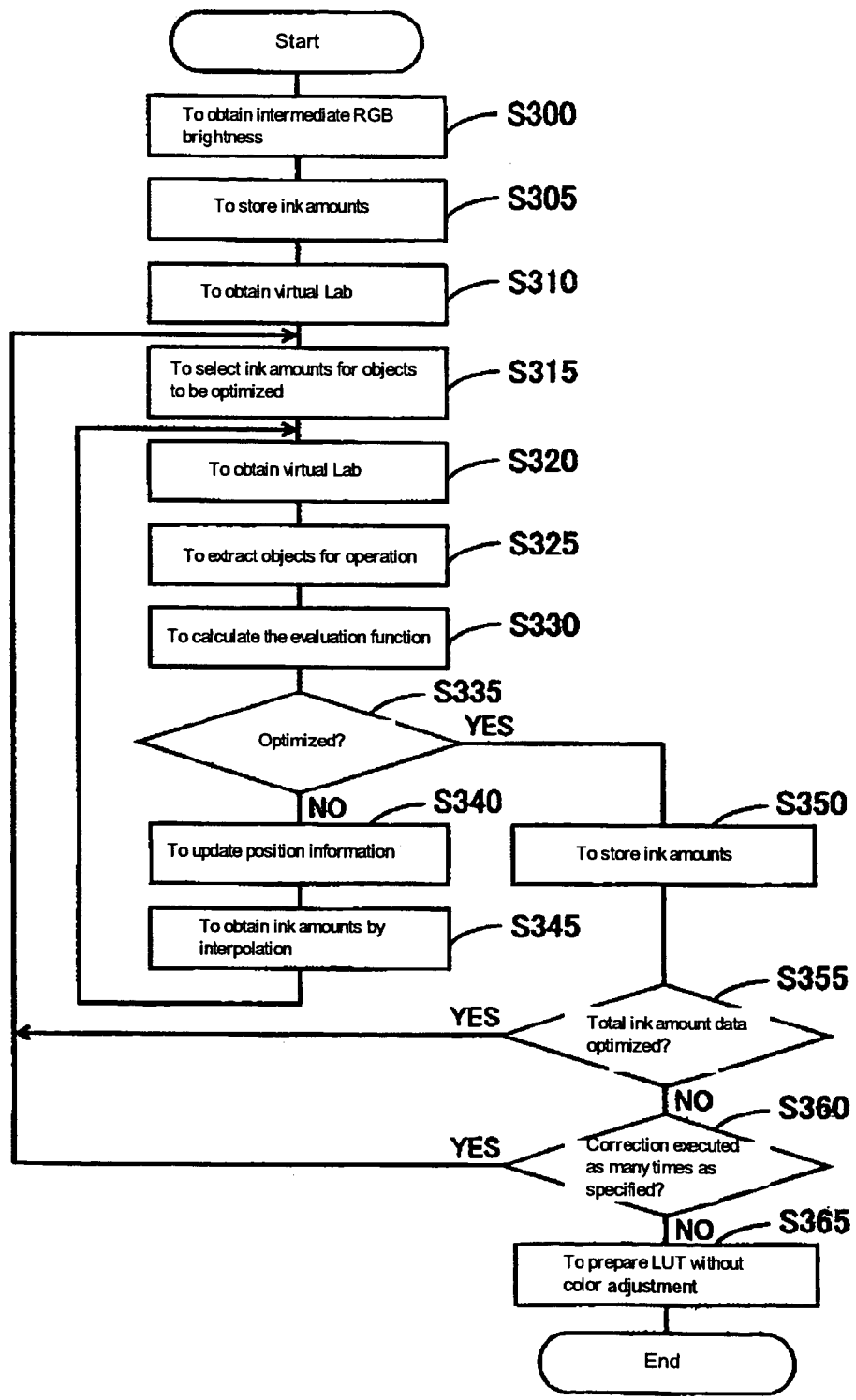
FIG. 6 is a flowchart for the smoothing procedure.

As mentioned above, the smoothing process is accomplished by the server, and the constitution of the server and the smoothing process are explained in detail in the following. The right side of FIG. 4 shows the general flow of processing in the server. FIG. 5 is a block diagram showing the constitution of the server. FIG. 6 is a flow chart of the smoothing process. The server 50 in this embodiment is based on a general-purpose computer. It is connected to the internet through the communication I/F 52. It transmits and receives various kinds of data through the communication I/F under the control of the communication controlling unit 54.

The communication controlling unit 54 receives in Step S200 the data transmitted by the client 10 in Step S130, and it records the DLL 40 on the hard disc 58 and also records the acquired colorimetric values 45 on the hard disc 58. The data showing the object for smoothing is transferred to the smoothing processing module 60. The server 50 is provided with CPU, ROM, RAM, etc. to execute programs, and makes the smoothing processing module 60 ready for execution. In Step S210, the smoothing processing module 60 performs smoothing on the color-separating LUT 43 as the object for smoothing. The resulting no color adjustment LUT 44 overwrites the DLL 40, and the updated DLL 40 is transmitted to the client 10 in Step S220.

In what follows, the smoothing process in step S210 is explained in detail with reference to FIGS. 5 and 6. The smoothing processing module 60 consists of the intermediate RGB brightness conversion processing unit 62a, the optimizing object extracting unit 62b, the virtual Lab value calculating unit 62c, the calculation object extracting unit 62d, the evaluation function calculating unit 62e, the position information updating unit 62f, the ink amount calculating unit 62g, and the no color adjustment LUT generating unit 62h. The intermediate RGB brightness conversion processing unit 62a is a module which references the calorimetric value 45, thereby converting them into the intermediate RGB brightness by simple calculation. The intermediate RGB brightness conversion processing unit 62a converts the calorimetric values 45 into the intermediate RGB brightness in Step S300, and records the result of conversion as the intermediate RGB brightness value 56a in the RAM 56.

To be concrete, the intermediate RGB brightness conversion processing unit 62a substitutes the CMY density tone indicated by the colorimetric values 45 into the formula (1) below, thereby calculating the intermediate RGB brightness for each patch of each ink color.

$$\begin{cases} Tr_i = 10^{-Dc_i} \\ Tg_i = 10^{-Dm_i} (i = 1 \ldots 6) \\ Tb_i = 10^{-Dy_i} \end{cases} \quad (1)$$

Incidentally, the formula (1) is a general formula to convert density into brightness; in this embodiment, the intermediate RGB brightness is obtained by regarding the CMY density as the independent variable for each color component. Here, Tr, Tg, Tb are referred to as intermediate RGB brightness, and they represent respectively the R brightness component, G brightness component, and B brightness component in each patch of each ink in single color. Also, Dc, Dm, Dy represent respectively the C density component, M density component, and Y density component, and i is a sign to distinguish ink colors.

The foregoing operation gives the intermediate RGB brightness for printing with the ink gradation value of each ink in single color. Therefore, if the correspondence between the intermediate RGB brightness and the ink gradation value of single color of each ink is referenced, it is possible to calculate the intermediate RGB brightness corresponding to the arbitrary gradation value of ink in single color by interpolation. By the foregoing processing, the intermediate RGB brightness is acquired and this value is recorded in the RAM 56 as the intermediate RGB brightness value 56a. In this embodiment, the virtual Lab value is calculated as mentioned above, and the virtual Lab value is changed in the virtual Lab color space by regarding as the variable the position information of lattice points in the color-separating LUT. Then, the unit 62c for calculating virtual Lab values calculates from the intermediate RGB brightness the RGB brightness corresponding to CMYKlclm data in the color-separating LUT 43 and calculates the Lab values from this RGB brightness and records them in the RAM 56 as the virtual Lab values 56c. Incidentally, since this intermediate RGB brightness is calculated by a simple formula from the intermediate RGB brightness, this RGB brightness is referred to as the virtual RGB brightness in this specification.

To be concrete, in Step S305, the unit 62b for extracting objects to be optimized records the CMYKlclm data prescribed in the color-separating LUT 43 in the RAM 56 as the ink amount data 56b. In Step S310, the unit 62c for calculating virtual Lab values calculates the virtual RGB brightness corresponding to the color represented by CMYKlclm data (this color is in the state of combination of each ink color according to the formula (2) below) for the ink amount data 56b.

$$\begin{cases} R = \prod_{i=1}^{6} Tr_i \\ G = \prod_{i=1}^{6} Tg_i \\ B = \prod_{i=1}^{6} Tb_i \end{cases} \quad (2)$$

After the virtual RGB brightness has been calculated as mentioned above, the calculated virtual RGB brightness is converted into the value of the XYZ color system by the 3×3 matrix and the value of the XYZ color system is further converted into the value of the Lab color system. The converted virtual Lab value is the above-mentioned virtual Lab value 56*c*; in this stage, the virtual Lab value corresponding to the CMYKlclm data prescribed by the color-separating LUT 43 is recorded in the RAM 56.

In the above-mentioned calculation, the calorimetric values 45 are colorimetric values of a small number (16-32) of patches for each ink, and the virtual RGB brightness and the corresponding virtual Lab values are obtained from this data by simple calculation. Here, the number of data to be calculated is equal to the number of all the reference points prescribed in the color-separating LUT 43; however, the objects for colorimetry are 16-32 multiplied by the number of inks plus paper white, and their number is much smaller than the number of reference points; therefore, it is possible to carry out processing much faster than the case in which all colors are measured.

Also, after smoothing in this embodiment, the module 22 to generate the media profile performs the processing which makes correspondence between the device-independent color and the RGB color (CMYKlclm data in its turn) in the no color adjustment LUT 44; therefore, it is not important in the smoothing process that the lattice points represent exactly correct colors. In other words, what is important is the degree of smoothness of the arrangement of lattice points. If the virtual Lab value is entirely different from the actual Lab value when the arrangement of lattice points is smoothed, then smoothing is nonsense; however, in this embodiment, the above-mentioned formulas (1) and (2) are based on the simplified Lambert-Beer's law, and hence there is no possibility that the virtual Lab value is entirely different from the actual Lab value. The present applicant's experiments revealed that the simple operation in this embodiment fully produces the effect of smoothing the arrangement of lattice points and that it is possible to prepare the color-correcting LUT that permits accurate color conversion.

Incidentally, the above-mentioned operation is merely an example; it is possible to calculate the above-mentioned virtual Lab value by various operations so long as it is close to the actual Lab value and the smoothing effect is fully produced. Colorimetry may be actually carried out if labor is not a problem. Selecting 16-32 gradations is also merely an example; the number of gradations may be smaller or larger than that. About 16-32 gradations generally give a good result. Moreover, gradations may be selected variously; it is possible to select gradations uniformly, or alternatively, it is possible to select more of gradations with smaller values in view of the ink characteristics that the larger the gradation value, the smaller the degree of change in density. Of course, it is possible to change the way of selecting gradations for each color. It is also possible to calculate by interpolation the CMY density corresponding to the ink amount by referencing the gradation of CMY density obtained by calorimetry and then acquire the intermediate RGB brightness.

In this embodiment, smoothing is accomplished recursively for each lattice point by the RGB data of the color-separating LUT by utilizing the above-mentioned intermediate RGB brightness value 55*a*, ink amount data 56*b*, and virtual Lab value 56*c*. In Step S315, the unit 62*b* for extracting objects to be optimized extracts the CMYKlclm data which has not yet undergone smoothing from a plurality of data recorded as the ink amount data 56*b* and extracts it as the object to be optimized. In Step S320, the unit 62*c* for calculating virtual Lab values calculates the virtual Lab values corresponding to the CMYKlclm data. In other words, it calculates the virtual Lab value corresponding to the CMYKlclm data to be optimized from the intermediate RGB brightness value 56*a* and the ink amount data 56*b*.

Smoothing is accomplished by utilizing the virtual Lab values corresponding to the CMYKlclm data to be optimized and the virtual Lab values corresponding to the neighboring lattice points. So, in Step S325, the unit 62*d* for extracting objects for calculation extracts the virtual Lab values corresponding to the lattice points which are present around the Lab lattice points to be optimized and which are adjacent to said lattice points. Incidentally, the virtual Lab values to be extracted vary depending on the spatial position of the virtual Lab lattice points to be optimized. This will be described later in detail.

The unit 62*e* for calculating the evaluation function calculates the evaluation function by utilizing the lattice point to be optimized (extracted in Step S330) and its neighboring lattice points. The evaluation function is a function whose value becomes smaller as the arrangement of the virtual Lab lattice points to be optimized is smoothed. Its variable is the position information which specifies the position of RGB lattice point of the color-separating LUT 43. In other words if the position information is adjusted, the virtual Lab values to be optimized vary and the optimized position information (or the position information which minimizes the evaluation function) is obtained. Incidentally, the evaluation function also varies in its form depending on the spatial position of the virtual lattice point to be optimized. The evaluation function is prepared by selecting an adequate function form according to the spatial position of the virtual Lab lattice point. A detail description is given later.

Moreover, the unit 62*e* for calculating the evaluation function calculates the value of the evaluation function calculated in Step S330 mentioned above, and in Step S335, it judges whether or not the calculated value is lower than a prescribed threshold value. In other words, when the value of the evaluation function is lower than the prescribed value, it judges that the position of the virtual Lab lattice point has been optimized (or sufficiently smoothed). If it is judged in Step S335 that the position of the virtual Lab lattice point is not optimized, the unit 62*f* for updating position information updates the optimized position information and records it in the RAM 56 as the position information 56*d*.

The next step after the position information has been updated is to calculate again the evaluation function in order to judge whether or not the virtual Lab value to be optimized is optimized by the ink amount corresponding to the RGB lattice point specified by the position information. In other words, in Step S345, the unit 62*g* for calculating ink amounts references the position information 56*d* and calculates the ink amount data (CMYKlclm data) corresponding to the updated position information. At this time, it references the ink amount data 56*b* and calculates the ink amount corresponding to the position information which has been updated by interpolation.

If the ink amount corresponding to the updated position information is calculated as mentioned above, it is possible to calculate the updated virtual Lab value from the ink amount. Therefore, by repeating the process after Step S320, it is possible to converge the value of the evaluation function below the specific threshold value mentioned above and it is possible to optimize the position of the virtual Lab lattice point. That is, the arrangement of lattice points is converged to the optimal position by optimizing the position information by the evaluation function (or minimizing the evaluation function) and by repeating the process after Step S320 until the virtual Lab lattice point is optimized (or the arrangement of lattice points is smoothed). Incidentally, as a concrete algorithm for optimization, it is possible to adopt various algorithms such as quasi-Newton method and conjugate gradient method.

On the other hand, when it is judged that the position of the virtual Lab lattice point has been optimized in Step S335, the ink amount data 56b is overwritten by the ink amount corresponding to the virtual Lab value at the time of optimization in Step S350, and it judges in Step S355 whether or not optimization is completed for all of the ink amount data 25b. And, the process after Step S315 is repeated until it judges in Step S355 that optimization is completed for all the ink amount data 56b.

In addition, in Step S360, it judges whether or not correction has been executed as many times as previously determined and repeats the process after Step S315 until it is judged that correction has been repeated as many times as prescribed. In other words, by repeating correction as many times as prescribed, it is guaranteed that the result of the optimizing process becomes the true solution. Of course, it is acceptable if it is guaranteed that it is completely optimized as a whole in Step S360, it is possible to judge for the total ink amount whether or not the value of the evaluation function and its average value are lower than the prescribed threshold value. Also, various constitutions may be adopted, for example, it is possible to recognize that complete optimization has been achieved when the average value of the evaluation function is approximately equal to the (n−1)th correction and the nth correction.

After the arrangement of lattice points has been smoothed sufficiently as mentioned above, it is possible to associate the RGB data with the ink amount data indicating the smoothed color in the Lab color space by associating the ink amount data 56b with the RGB data specified in the color-separating LUT 43. So, in Step S365, the unit 62h for generating the no color adjustment LUT overwrites the CMYKlclm data prescribed in the color-separating LUT 43 with the ink amount data 56b, thereby generating the no color adjustment LUT 44 in which the arrangement of lattice points has been smoothed and recording it in the hard disc 58 such that the color-separating LUT 43 to be smoothed is overwritten by the no color adjustment LUT 44.

As mentioned above, in this embodiment, it is not always the case that the components of each color of the ink amount or CMYKlclm data are directly adjusted. If CMYKlclm data is to be adjusted, it is necessary to make adjustment in such a way that the rule considered when the color-separating LUT 43 has been prepared is satisfied. In consideration of this rule, arbitrariness is low when the CMYKlclm data is adjusted, and it sometimes becomes difficult that the arrangement of lattice points is sufficiently smoothed. However, in this embodiment, CMYKlclm data is not adjusted directly, but rather, the position information is made to change and the virtual Lab lattice points are adjusted.

Therefore, it is not necessary to take into consideration the rule applied when the color-separating LUT 43 is prepared and hence the degree of freedom in moving the virtual Lab lattice points is large. As the result, it is possible to easily optimize the arrangement of the virtual Lab lattice points. On the other hand, in Step S345, the ink amount data corresponding to the lattice point in terms of the updated position information 56d is obtained by referencing the ink amount prescribed in the color-separating LUT or the ink amount after smoothing. Therefore, the rule applied when the color-separating LUT 43 is prepared is reflected without deviation from the combination of the ink amount in the color-separating LUT. Therefore, the no color adjustment LUT 44 to be prepared satisfies the rule applied when the color-separating LUT 43 is prepared and the arrangement of lattice points is also smoothed.

(4) Optimization by Means of Evaluation Function

Figure 7:
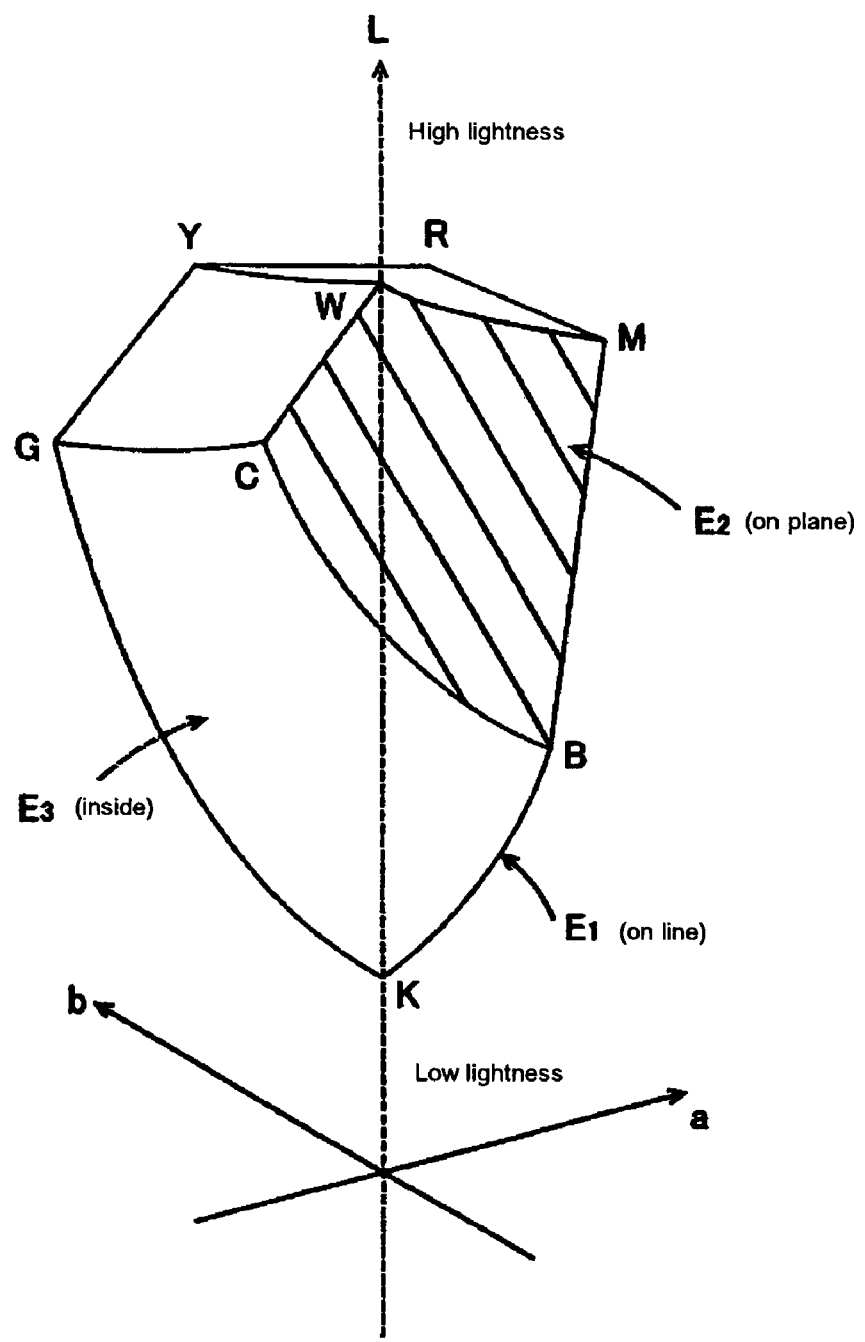
FIG. 7 is a schematic diagram showing the color gamut of the printer.

Next, the optimization by means of the evaluation function in Steps S320 to S340 will be described in detail in the following. FIG. 7 is a schematic diagram showing the color gamut of the printer 15 in the Lab color space. The color gamut of the printer 15 is distorted in the Lab color space, as shown in this figure. Also, since the virtual Lab value is close to the actual Lab value as mentioned above, the color gamut which the virtual Lab value forms has the same shape as the solid body shown in FIG. 7. On the other hand, when the color of an image is expressed in terms of the combination of RGB data in the color-separating LUT, the color gamut in the RGB color space which is formed such that the component of each of RGB constitute the axes of the orthogonal three-dimensional space takes on the cubic shape shown in the upper left part in FIG. 2.

The color gamut in the Lab color space has a distorted shape, but the boundary of that color gamut can be easily associated with the boundary of the color gamut in the RGB color space. That is, the boundary of the color gamut in the RGB color space consists of 12 edge lines and 6 planes forming the cubic body. The boundary of the color gamut in the Lab color space also consists of 12 edge lines and 6 planes. To be concrete, the color changes from K to B if the B component only has finite values along the edge line on the B axis from the origin in the RGB color space, with the R and G components fixed at the minimum values, and the colors in the Lab color space corresponding to these colors are on the edge line indicated by $E_1$ in FIG. 7.

Similarly, in the cubic body shown in the upper left part of FIG. 2, the apexes at the uppermost plane represent respectively BWCM (W=white). The colors on this plane may be expressed by fixing the B component only at the maximum value and varying other components arbitrarily. The colors on this plane are on the plane indicated by $E_2$ in the color gamut shown in FIG. 7. Therefore, it can be said that the color is on the boundary of the color gamut if any one of the RGB data of the color-separating LUT has the maximum or minimum value. If the color on this boundary of the color gamut is freely movable in the virtual Lab color space when the above-mentioned optimization is carried out, it would be impossible to secure the sufficient large color gamut. So, in this embodiment, in order to maintain the size of the color gamut, the evaluation function is acquired which differs in function form on the 12 edge lines formed at the boundary of the color gamut, on the 6 outer planes, and in the color gamut.

(4-1) Evaluation Function $E_1$

Figure 8:
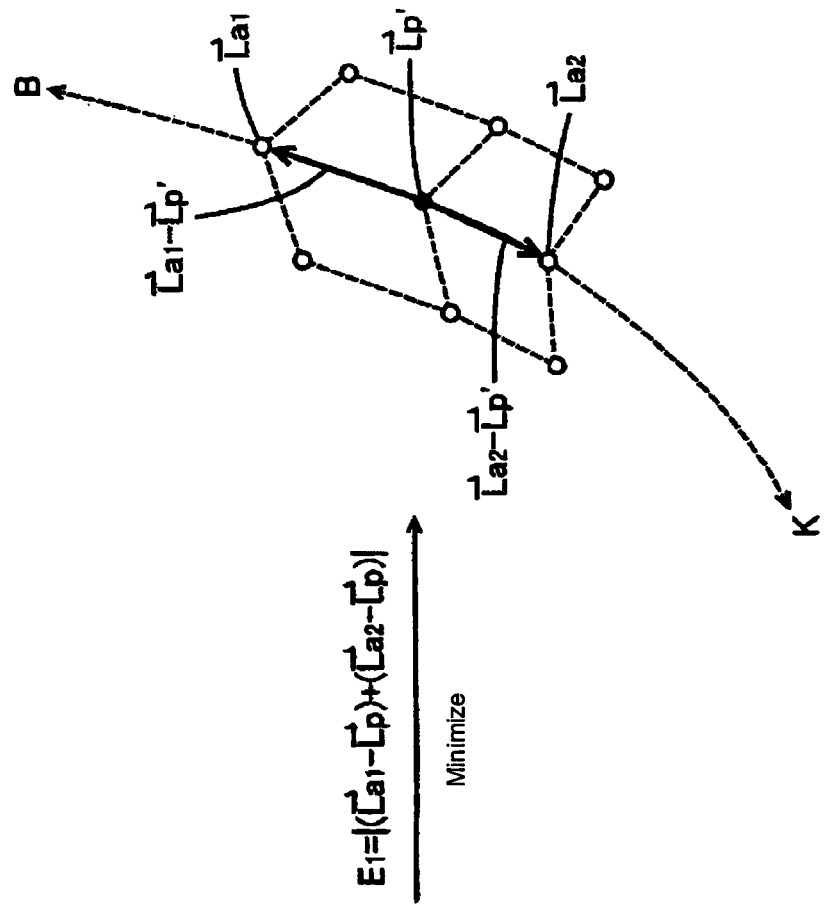
FIG. 8 is a diagram showing the evaluation function that optimizes the lattice point on the edge line.
Figure 8:
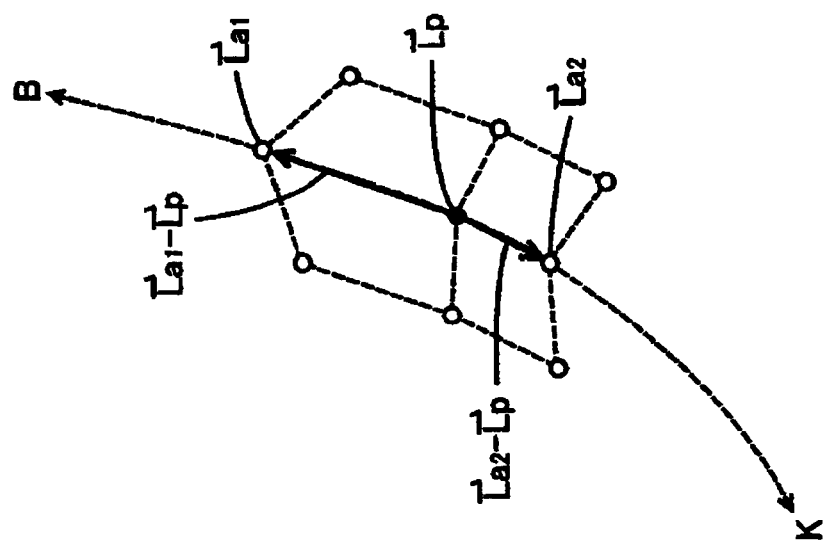

FIG. 8 is a diagram that illustrates the evaluation function to optimize the lattice point on the edge line formed on the color gamut in the Lab color space. In this figure, the curves drawn with broken lines represent the edge lines formed on the boundary of the color gamut. The lattice point to be optimized is indicated by a black circle, and the neighboring lattice points are indicated by white circles. In order to maintain the size of the color gamut, it is necessary that the lattice point to be optimized (indicated by the black circle) should be on the edge line indicated by the broken line. So, in this embodiment, when the unit 62b for extracting objects to be optimized extracts the lattice point on the edge line indicated by the broken line as the object to be optimized, as shown in FIG. 8, the unit 62d for extracting objects for calculation extracts, as the lattice point for calculation, the lattice point which is adjacent to the lattice point to be optimized and present on the edge line indicated by the broken line.

In this figure, the lattice point to be optimized is denoted by the vector $\vec{L_p}$, and the lattice points to be extracted by the unit 62d for extracting objects for calculation are denoted by the vectors $\vec{L_{a1}}$ and $\vec{L_{a2}}$. Here, the vector $\vec{L_p}$ is calculated by the formula (3) below, and it is expressed in terms of the above-mentioned position information (Pr, Pg, Pb) as the variables. In this embodiment, the position information may be a variable which univocally specifies the virtual Lab value and a value that can specify the position of the RGB lattice point in the color-separating LUT.

$$\vec{L_p} = f(Pr, Pg, Pb) \tag{3}$$

Also, f in this formula is a function which obtains the virtual Lab vector from the position information (Pr, Pg, Pb). The function f is the formula for interpolation to calculate the ink amount corresponding to the position information (Pr, Pg, Pb) and the formula to calculate the virtual Lab value through the XYZ color system by the above-mentioned formula (2) and the above-mentioned matrix from the ink amount after said calculation.

The evaluation function utilizes these vectors $L_p$, $L_{a1}$, and $L_{a2}$ and calculates by the formula (4) shown below.

$$E_1 = |(\vec{L_{a1}} - \vec{L_p}) + (\vec{L_{a2}} - \vec{L_p})| \tag{4}$$

In other words, the function has the minimum value when the distance between the lattice point to be optimized and one lattice point adjacent to it in one direction is equal to the distance between the lattice point to be optimized and the other lattice point adjacent to it in the opposite direction. Also, the function increases in its value as the two distances differ more and the directions deviate more from the exact opposite direction.

When lattice points are evenly arranged, the arrangement of lattice points tends to be smoothed; therefore, by minimizing $E_1$ shown in the formula (4), it is possible to acquire the vector $\vec{L'_p}$, with the vector $\vec{L_p}$ optimized for the position of lattice point, as shown in the right part of FIG. 8. Also, the vectors $L_p$, $L_{a1}$, and $L_{a2}$ are represented by the position information (Pr, Pg, Pb); however, in the evaluation function $E_1$, the position information that gives the vectors $L_{a1}$ and $L_{a2}$ is fixed and it is the position information (Pr, Pg, Pb) that gives the vector $L_p$, only one of them is variable and other two are fixed at the minimum or maximum value. For example, the color on the edge line indicated by the broken line in FIG. 8 exists between B and K and the position information Pr and Pg that specify the RGB lattice point corresponding to this color is the minimal value and the position information Pb is an arbitrary value. So, in order to move the lattice point in the Lab color space along this edge line, it is only necessary that the position information Pr and Pg be fixed at minimum and the Pb be variable.

This is the same for the other edge line of the boundary of the color gamut. When the lattice point to be optimized exists on the boundary of the color gamut and the edge line from K to R, the position information Pg and Pb is fixed at minimum and Pr is made variable. When the lattice point to be optimized exists on the boundary of the color gamut and the edge line from K to G, the position information Pr and Pb is fixed at minimum and Pg is made variable. In addition, when the lattice point to be optimized exists on the boundary of the color gamut and the edge line from W to C, the position information Pg and Pb is fixed at maximum and Pr is made variable. When the lattice point to be optimized exists on the boundary of the color gamut and the edge line from W to M, the position information Pr and Pb is fixed at maximum and Pr is made variable. When the lattice point to be optimized exists on the boundary of the color gamut and the edge line from W to Y, the position information Pr and Pb is fixed at maximum and Pr is made variable.

Moreover, when the lattice point to be optimized exists on the boundary of the color gamut and the edge line from M to R, the position information Pr and Pg is fixed at maximum and minimum, respectively, and Pb is made variable. When the lattice point to be optimized exists on the boundary of the color gamut and the edge line from M to B, the position information Pb and Pg is fixed at maximum and minimum, respectively, and Pr is made variable. When the lattice point to be optimized exists on the boundary of the color gamut and the edge line from C to G, the position information Pg and Pr is fixed at maximum and minimum, respectively, and Pb is made variable. When the lattice point to be optimized exists on the boundary of the color gamut and the edge line from C to B, the position information Pb and Pr is fixed at maximum and minimum, respectively, and Pr is made variable.

When the lattice point to be optimized exists on the boundary of the color gamut and the edge line from Y to R, the position information Pr and Pb is fixed at maximum and minimum, respectively, and Pg is made variable. As mentioned above, the position information to be varied according to the position of the lattice point to be optimized is varied adequately so that the evaluation function is minimized; in this way the position information that minimizes the evaluation function $E_1$ at that time is calculated and, by repeating this process, it is possible to acquire the vector $L'_p$ with the optimized position of lattice point.

(4-2) Evaluation Function $E_2$

Figure 9:
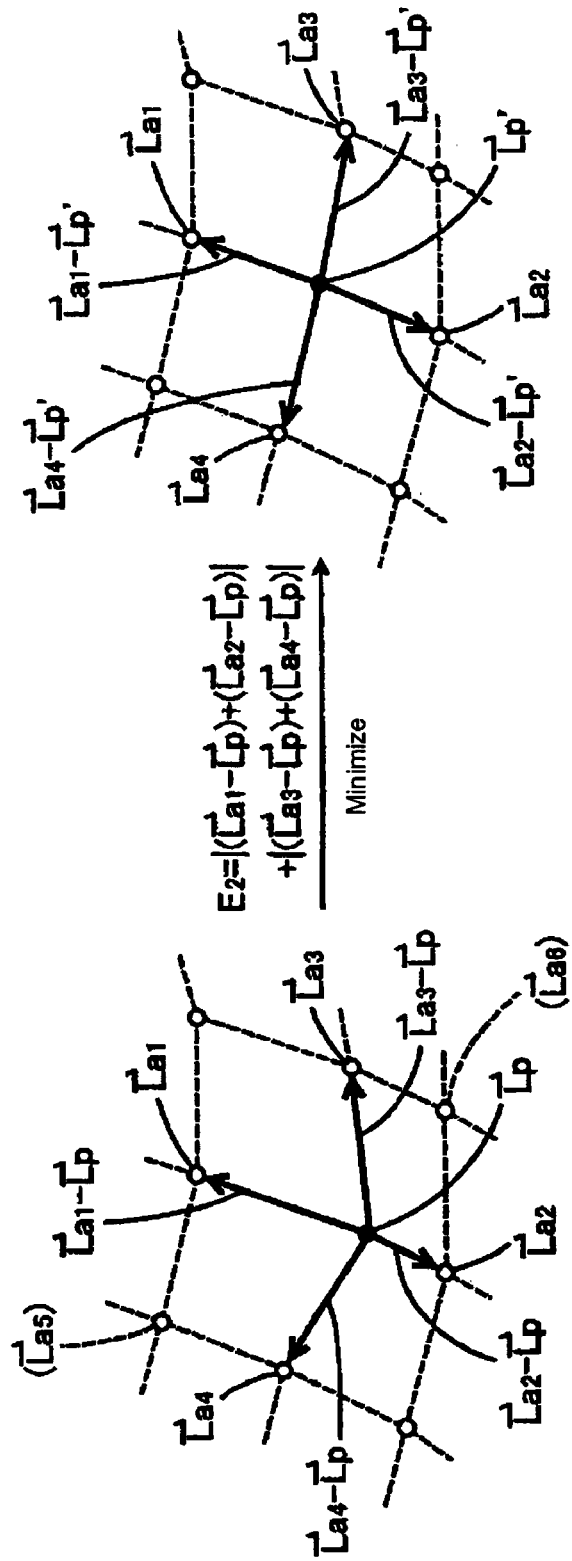
FIG. 9 is a diagram showing the evaluation function that optimizes the lattice point on the outer plane.

FIG. 9 is a diagram that illustrates the evaluation function to optimize the lattice point on the outer plane formed by the boundary of the color gamut in the Lab color space. In this figure, each broken line is a straight line that connects lattice points with each other. These lattice points exist on the outer plane formed by the boundary of the color gamut, and hence it follows that the other lattice points exist either behind or in front of the paper. The lattice point to be optimized is indicated by the black circle, and its neighboring lattice points are indicated by the white circles. In order to maintain the size of the color gamut, the lattice point to be optimized is not allowed to greatly move in the vertical direction with respect to the outer plane on which the lattice points indicated by the black and white circles exist. So, in this embodiment, when the unit 62b for extracting objects to be optimized has extracted the lattice point existing on the outer plane formed by the boundary of the color gamut, which is indicated by the black circle in FIG. 9 as the object to be optimized, the unit 62d for extracting the object for calculation extracts as the lattice points for operation four lattice points which are adjacent to the lattice point to be optimized and exist on the outer plane formed by the boundary of the color gamut.

In this figure, the lattice point to be optimized is denoted by the vector $\vec{L_p}$, and the lattice points to be extracted by the unit 62d for extracting objects for calculation are denoted by the vectors $\vec{L_{a1}}$ to $\vec{L_{a4}}$. Here, the vector $\vec{L_p}$ is calculated by the formula (3) above, and it is expressed in terms of the above-mentioned position information (Pr, Pg, Pb) as the variables. The evaluation function to optimize the lattice points existing on the outer plane formed by the boundary of the color gamut utilizes the vector $L_p$ and these vectors $L_{a1}$ to $L_{a4}$ and is expressed by the formula (5) shown below.

$$E_2 = |(\vec{L_{a1}} - \vec{L_p}) + (\vec{L_{a2}} - \vec{L_p})| + |(\vec{L_{a3}} - \vec{L_p}) + (\vec{L_{a4}} - \vec{L_p})| \tag{5}$$

In other words, the evaluation function has a smaller value when the distances of vectors in mutually opposite direction from the lattice point to be optimized are equal and their directions are close to the exact opposite direction.

When the line connecting adjacent lattice points is closer to a straight line (the line that passes through the lattice points indicated by vector $L_{a1}$~vector $L_p$~vector $L_{a2}$ in FIG. 9), or when the lattice points are more evenly arranged, the arrangement of lattice points tends to be smoothed; therefore, by minimizing $E_2$ shown in the formula (5), it is possible to acquire the vector $L'_p$, with the vector $L_p$ optimized for the position of lattice point, as shown in the right part of FIG. 9. Also, the vector $L_p$ and vectors $L_{a1}$~$L_{a4}$ are represented by the position information (Pr, Pg, Pb); however, in the evaluation function $E_2$, the position information that gives the vector $L_p$ is the position information (Pr, Pg, Pb), only two of them are variable and other one is fixed at the minimum or maximum value. For example, the color on the outer plane WMBC formed by the boundary of the color gamut indicated by hatched lines in FIG. 7 is the color in the case where the B component is maximum and the R and B components are varied arbitrarily. The position information Pb of the RGB lattice point corresponding to this color is the maximum value and the position information Pr and Pg is the arbitrary value. So, in order to move the lattice point in the Lab color space on the outer plane WMBC, it is only necessary that the position information Pb be fixed at minimum and the Pr and Pg be variable.

This is the same for the other outer plane formed by the boundary of the color gamut. The color on the outer plane MRKB formed by the boundary of the color gamut is the color in the case where the G component is minimum and the R and B components are varied arbitrarily; if the position information Pg is fixed at the minimum value and Pr and Pb are varied, it is possible to move the lattice points to be optimized on the above-mentioned outer plane MRKB. The color on the outer plane RYGK formed by the boundary of the color gamut is the color in the case where the B component is minimum and the R and G components are varied arbitrarily; if the position information Pb is fixed at the minimum value and Pr and Pg are varied, it is possible to move the lattice points to be optimized on the above-mentioned outer plane RYGK.

In addition, the color on the outer plane YWCG formed by the boundary of the color gamut is the color in the case where the G component is maximum and the R and B components are varied arbitrarily; if the position information Pg is fixed at the maximum value and Pr and Pb are varied, it is possible to move the lattice points to be optimized on the above-mentioned outer plane YWCG. The color on the outer plane WYRM formed by the boundary of the color gamut is the color in the case where the R component is maximum and the G and B components are varied arbitrarily; if the position information Pr is fixed at the maximum value and Pg and Pb are varied, it is possible to move the lattice points to be optimized on the above-mentioned outer plane YWRM.

The color on the outer plane CGKB formed by the boundary of the color gamut is the color in the case where the R component is minimum and the G and B components are varied arbitrarily; if the position information Pr is fixed at the minimum value and Pg and Pb are varied, it is possible to move the lattice points to be optimized on the above-mentioned outer plane CGKB. As mentioned above, if the position information that is varied by the position of the lattice point to be optimized is selected and the evaluation function $E_2$ is minimized, the position information that minimizes the evaluation function at that time is calculated, and by repeating this process it is possible to acquire the vector $L'_p$ with the position of the lattice point optimized.

(4-3) Evaluation Function $E_3$

Figure 10:
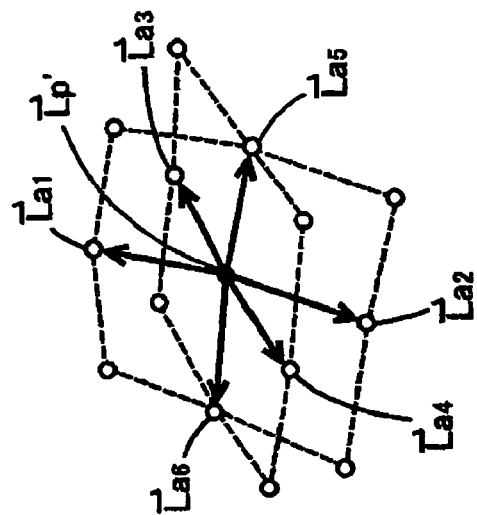
FIG. 10 is a diagram showing the evaluation function that optimizes the lattice point inside the color gamut.
Figure 10:
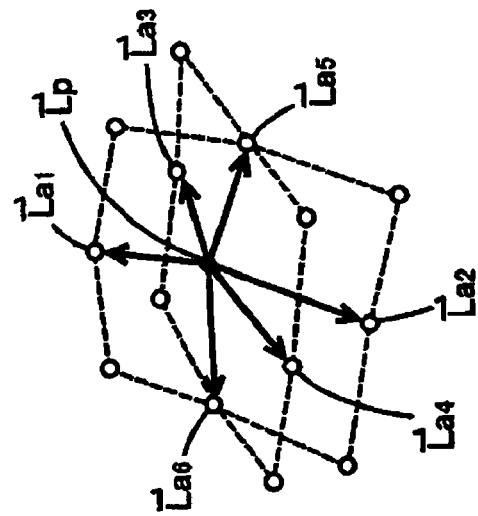

FIG. 10 is a diagram that illustrates the evaluation function to optimize the lattice point existing inside except for the boundary of the color gamut in the Lab color space. In this figure, each broken line is a straight line that connects a plurality of lattice points with each other. These lattice points exist on the plane which is formed when the color gamut is cut in two directions. The lattice point to be optimized is indicated by the black circle, and its neighboring lattice points are indicated by the white circles. In this embodiment, the lattice points inside the color gamut are moved freely without imposing conditions to maintain the size of the color gamut. So, in this embodiment, when the unit 62b for extracting objects to be optimized has extracted the lattice point existing inside the color gamut, which is indicated by the black circle in FIG. 10 as the object to be optimized, the unit 62d for extracting the objects for calculation extracts as the lattice points for operation six lattice points which are adjacent to the lattice point to be optimized in six directions.

In this figure, the lattice point to be optimized is denoted by the vector $L_p$, and the lattice points to be extracted by the unit 62d for extracting objects for calculation are denoted by the vectors $L_{a1}$ to $L_{a6}$. Here, the vector $L_p$ is calculated by the formula (3) above, and it is expressed in terms of the above-mentioned position information (Pr, Pg, Pb) as the variables. The evaluation function to optimize the lattice points existing inside the color gamut utilizes the vector $L_p$ and these vectors $L_{a1}$ to $L_{a6}$ and is expressed by the formula (6) shown below.

$$E_3 = |(\vec{L_{a1}} - \vec{L_p}) + (\vec{L_{a2}} - \vec{L_p})|$$
$$+ |(\vec{L_{a3}} - \vec{L_p}) + (\vec{L_{a4}} - \vec{L_p})|$$
$$+ |(\vec{L_{a5}} - \vec{L_p}) + (\vec{L_{a5}} - \vec{L_p})| \quad (6)$$

In other words, the evaluation function has a smaller value when the distances of vectors in mutually opposite direction from the lattice point to be optimized are equal and their directions are close to the exact opposite direction.

The closer the line connecting adjacent lattice points is to a straight line (the line that passes through the lattice points indicated by vector $L_{a1}$~vector $L_p$~vector $L_{a2}$ in FIG. 10), or the more evenly the lattice points are arranged, the more highly the arrangement of lattice points tends to be smoothed; therefore, by minimizing $E_3$ shown in the formula (6), it is possible to acquire the vector $L'_p$, with the vector $L_p$ optimized for the position of lattice point, as shown in the right part of FIG. 10.

Also, the vector $L_p$ and vectors $L_{a1}$~$L_{a6}$ are represented by the position information (Pr, Pg, Pb) and the position information (Pr, Pg, Pb) that gives the vector $L_p$ in the evaluation function $E_3$ is all variable. As mentioned above, if the position vector is varied and the evaluation function $E_3$ is minimized, it is possible to calculate the position information that minimizes the evaluation function at that time and, by repeating this process, it is possible to acquire the vector $L'_p$, with the position of lattice point optimized.

(5) Another Embodiment

The above-mentioned embodiment is merely one example, and it is possible to accept other constitutions so long as they permit accurate color conversion by performing the smoothing process. Moreover, in the above-mentioned evaluation function, it is permissible to adopt a function that increases in value when the degree of smoothness of the arrangement of lattice points in the virtual Lab color space decreases, and various functions other than mentioned above can be adopted. For example, in the above-mentioned evaluation functions $E_2$ and $E_3$, only the lattice points for which the vector is orthogonal when the lattice point forms the cubic lattice are extracted as the neighboring lattice points to be optimized. Selection in this manner is not always essential. For example, the evaluation function may be the one which includes the lattice point at the orthogonal position when the lattice points like vectors $L_{a5}$ and $L_{a6}$ in FIG. 9 form the cubic lattice. Such a lattice point at the orthogonal position is at the orthogonal position also in the RGB space, and particularly, the orthogonal axis of R=G=B corresponds to the gray axis. Therefore, if the degree of smoothness of the arrangement increases also for the lattice point at the orthogonal position, it is possible to prevent the occurrence of tone jump at the time of monochrome output.

In addition, in the above-mentioned embodiments, the sum of vectors in the opposite directions is taken so that the evaluation function has a small value for the arrangement of lattice points with a high degree of smoothness. Of course, other constitutions may be adopted. For example it may be a function which evaluates whether or not the relative positional relation between lattice points is similar. To be concrete, if a difference between vector $L_{a5}$-vector $L_{a4}$ and vector $L_{a1}$-vector $L_p$ in FIG. 9 is taken, the difference vector of the two vectors or (vector $L_{a5}$-vector $L_{a4}$)-(vector $L_{a1}$-vector $L_p$) is obtained. It can be said that the smaller the difference vector, the more similar the relative positional relation between the lattice points. Therefore, by adding the difference between (vector $L_{a1}$-vector $L_p$) and the neighboring vectors, it is possible to acquire the evaluation function that evaluates the degree of smoothness of the arrangement.

In addition, in the above-mentioned evaluation function, the difference of vectors in the opposite directions with respect to the center of lattice points to be optimized is taken and individual differences are added. In other words, the state in which all the lattice points are uniform in the virtual Lab color space is regarded as ideal. However, in the case where the lattice points formed in the RGB space by the RGB data prescribed by the color-separating LUT 43 are originally nonuniform or the intervals of lattice points in the Lab color space is intentionally made nonuniform, the evaluation function may be modified. If nonuniform lattice points are to be regarded as optimal, it is possible to meet this requirement by adding to the evaluation function the weighting factors as expressed by the formula (7) below.

$$E_1 = |W_1(\vec{L_{a1}} - \vec{L_p}) + W_2(\vec{L_{a2}} - \vec{L_p})| \quad (7)$$

where, $W_1$ and $W_2$ are weighting factors.

In other words, if $W_1 > W_2$ in the formula (7), it is possible to make small the value of the evaluation function $E_1$ in the state in which the magnitude of difference vector $L_{a1}$-vector $L_p$ is smaller than that of vector $L_{a2}$-vector $L_p$ and it is also possible to regard optimal the state in which the lattice point to be optimized is close to either of the lattice points. Incidentally, the weighting factor may take various forms; it may be determined by, for example, the formula (8) below in the case where the lattice points are arranged at nonuniform intervals.

$$\begin{cases} W_1 = \dfrac{D_2}{D_1 + D_2} \\ W_2 = \dfrac{D_1}{D_1 + D_2} \end{cases} \quad (8)$$

Here, $D_1$ and $D_2$ each denote the distance in the RGB color space. $D_1$ denotes the distance between the RGB lattice point of the color-separating LUT that gives the virtual Lab vector $L_{a1}$ and the RGB lattice point of the color-separating LUT that gives the vector $L_p$. $D_2$ denotes the distance between the RGB lattice point of the color-separating LUT that gives the virtual Lab vector $L_{a2}$ and the RGB lattice point of the color-separating LUT that gives the vector $L_p$. Of course, the formula (8) is merely one example; by designing the other evaluation function with weighting, it is possible to control the interval between lattice points in the virtual color space in terms of the interval of lattice points formed by the RGB data of the color-separating LUT and to locally increase the density of lattice points in the virtual Lab color space according a special intention. Moreover, in the case of the evaluation functions $E_2$ and $E_3$, too, it is possible to easily control the interval between lattice points by addition of weighting.

The constitution in which the intervals of lattice points in the virtual Lab color space are controlled by designing the evaluation function with weighting is advantageous particularly in the case where the intervals of lattices points are made nonuniform according to the ink characteristics or in the case where the number of lattice points is increased at a low ink recording ratio in consideration of the ink property that the greater the ink recording ratio, the smaller the degree of change in density. Moreover, the constitution in which the density of lattice points is increased locally in the virtual Lab color space by designing the evaluation function with weighting is advantageous particularly in the case where it is desirable to locally enhance the accuracy of color conversion.

Moreover, in the above-mentioned embodiments, the smoothing of the arrangement of lattice point to be optimized is accomplished by extracting the separate neighboring lattice points for each part in the virtual Lab color space and consequently there is no relation among the respective lattice points to be optimized by each of evaluation function $E_1$ to evaluation function $E_3$. So, it is acceptable to perform operation with weighting such that the degree of smoothness of the arrangement increases at the boundary of each part, too, by optimizing the lattice point by individual evaluation functions for each part.

In the above-mentioned evaluation functions $E_1$ and $E_2$, any one or two of the position information (Pr, Pg, Pb) is fixed; however, in the evaluation function $E_3$, all three of the position information (Pr, Pg, Pb) are variable, and hence the constraint condition rapidly changes in the vicinity of the boundary of the color gamut. Also, the restraint condition rapidly changes at the edge line and outer plane that form the boundary of the color gamut even between the boundary of the color gamut. As the constraint condition changes rapidly, the degree of freedom in moving lattice points to smooth the arrangement of lattice points and the degree of freedom in the moving direction are entirely different. In such a case, there is the possibility that discontinuity occurs in the degree of smoothness of the arrangement of lattice points. So, in order to prevent the constraint condition from changing rapidly, the evaluation function is given a term which is weighted such that the position information hardly fluctuates.

If it is assumed that the range of values of RGB data in the color-separating LUT is 0~255, then it can be said that the farther each color component of RGB data is from the middle point of the value range, the closer the virtual Lab lattice point is to the boundary of the color gamut. Therefore, for the R component, it is possible to judge whether or not it is close to the boundary of the color gamut in terms of the absolute value |R−127.5|. So, by considering other color components in the same way, weight corresponding to the degree of closeness to the boundary of the color gamut is defined by the formula (9).

$$\begin{cases} Wr = k_{wr}\left(\dfrac{|R-127.5|}{127.5}\right)^{\gamma_{wr}} \\ Wg = k_{wg}\left(\dfrac{|G-127.5|}{127.5}\right)^{\gamma_{wg}} \\ Wb = k_{wb}\left(\dfrac{|B-127.5|}{127.5}\right)^{\gamma_{wb}} \end{cases} \quad (9)$$

Incidentally, Wr, Wg, and $W_b$ denote respectively the weight which varies Pr, Pg, and Pb. And, $k_{wr}$, $k_{wg}$, and $k_{wb}$ denote respectively the factor that determines the magnitude of each weight. They should be sufficiently large so that each position information does not fluctuate at the boundary of the color gamut. $\gamma_{wr}$, $\gamma_{wg}$, and $\gamma_{wb}$ denote respectively the factors that adjust the degree of change of the magnitude of weight. By adjusting these factors, it is possible to change the weight according to the RGB data in the color-separating LUT. They enable sufficient optimization without excessive weight in the vicinity of the center of the color gamut.

Here, the above-mentioned evaluation function $E_1$ will be described in detail with reference to a concrete example in consideration of the edge of the boundary of the color gamut in the case where only Pr (as the position information) is variable. The formula (10) below is the evaluation function $E_1$ to which the above-mentioned weight $W_r$ is added.

$$E_1 = |W_1(\vec{L_{a1}} - \vec{L_P}) + W_2(\vec{L_{a2}} - \vec{L_P})| + Wr(Pr_0 - Pr)^2 \quad (10)$$

The second term in this formula is the term added so that the position information Pr becomes harder to change as it approaches the boundary of the color gamut (the end of the edge line formed on the boundary of the color gamut in this case). $P_{r0}$ denotes the present position information in the R direction.

In other words, the closer the second term in the above formula is to the boundary of the color gamut, the larger is the value of the weighting factor $W_r$, and the farther the position information $P_r$ is from the present position $P_{r0}$, the larger is the second term. Therefore, in the optimizing process to minimize the evaluation function $E_1$, the position information $P_r$ and $P_{r0}$ become close values and both position information take close values as they are close to the boundary of the color gamut. Incidentally, even in the case where only the position information Pg is variable or only the position information Pb is variable, the second term can be added to the evaluation function $E_1$ based on the same idea. Of course, the evaluation function $E_2$ and the evaluation function $E_3$ may be the same; in the evaluation function $E_2$, two components of the position information are variable and hence two terms are added to the evaluation function; in the evaluation function E3, three components of the position information are variable and hence three terms are added to the evaluation function.

Moreover, the above-mentioned embodiment is constructed such that the server 50 prepares the no color adjustment LUT 44 and the client 10 prepares the media profile 42 while referencing the no color adjustment LUT 44. This construction may be modified such that the server 50 prepares the no color adjustment LUT 44 as well as the media profile 42 and transmits them to the client 10. In this case, it is only necessary for the client 10 to transmit DLL 40 and media profile 42 and to receive the updated DLL 40 and media profile 42. This is achieved by the client 10 with a very simple program. It is very easy to previously incorporate such a program (as an additional feature) into the printer driver 30. Further modification may be made such that the client 10 merely sends DLL 40 and data showing the object for smoothing instead of performing colorimetry, and the server performs colorimetry to obtain the colorimetric values.

Also, the above-mentioned embodiment is constructed such that the color-separating LUT 43 is updated. This may be modified such that the no color adjustment LUT 44 which has been updated is transmitted to the server 50 for use as the object for smoothing. The advantage of this modification is that even though accuracy of color conversion decreases due to fluctuation with time after the color-separating LUT 43 has been smoothed and the no color adjustment LUT 44 (capable of highly accurate color conversion) has been prepared, it is possible to acquire the no color adjustment LUT 44 (capable of highly accurate color conversion) and the media profile 42.

In addition, the above-mentioned embodiment is constructed such that color conversion is carried out by the ICC profile. This may be modified such that color conversion is carried out by using the color-correcting LUT which converts the image data for the display into the image data for the printer. Color conversion in this case is accomplished by direct conversion from sRGB data into CMYKlclm data by the color-correcting LUT which previously associates the input image data (sRGB data) with the output image data (CMYKlclm data) instead of referencing the source profile 41, the media profile 42, and the color-separating LUT 43.

This color-correcting LUT is prepared by making the target Lab value the target sRGB value, thereby associating the sRGB data with the RGB data for the no color adjustment LUT 44, and associating the CMYKlclm data obtained from this RGB data by conversion by the no color adjustment LUT 44 with the original sRGB data. Therefore, the present invention in which the no color adjustment LUT 44 is smoothed may be applied to prepare the color-correcting LUT capable of highly accurate color conversion and perform printing with highly accurate color conversion.

Also, in the above-mentioned printer 17c it was possible to mount six color inks of CMYKlclm; however, it is permissible to increase the number of colors by adding DY (dark yellow) or to decrease the number of colors by omitting lclm. It is also possible to mount six color inks of CMYKRV by using other colors, for example, R (red) and V (violet).

Although the present invention has been described and illustrated in detail, it is clearly understood that the same is by way illustration and example only and is not to be taken by way of limitation, the spirit and scope of the present invention being limited only by the terms of the appended claims.

What is claimed is:

1. A system for a server to determine a plurality of lattice points to be referenced to prepare correspondence defining data that defines correspondence between an amount of ink for each color used by a printing apparatus connected to a client and a value of a color component in a specific color system, in which:

said client has a unit to record original correspondence defining data which previously prescribes correspondence between the lattice points in a low-dimensional color space prescribed by less color components than a number of inks for each color and the lattice points for an ink amount in an ink amount space, a client's communication unit to transmit and receive data through a two-way communication line, and a unit to transmit the original correspondence defining data to the server through the client's communication unit; and said server has a server's communication unit to transmit and receive data through a two-way communication line, a unit to receive the original correspondence defining data through the server's communication unit, a unit to acquire correspondence between lattice points in the low-dimensional color space and lattice points in a device-independent color space by referencing the original correspondence defining data, a unit to prescribe a smoothness evaluation function which evaluates smoothness of an arrangement of lattice points in the device-independent color space and has as a variable information about a position of lattice points in the low-dimensional color space, the smoothness evaluation function having a minimum value when a first distance between a lattice point to be optimized and an adjacent lattice point in a first direction is equal to a second distance between the lattice point to be optimized and an adjacent lattice point in a second direction that is opposite to the first direction, and the smoothness evaluation function increasing in value as a difference between the first distance and the second distance increases, a unit to optimize the arrangement of lattice points in the device-independent color-space by improving a rating of the smoothness evaluation function, with the information about the position of lattice points varied, and a unit to determine lattice points for the correspondence defining data by associating the amount of ink for each color corresponding to lattice points in the low-dimensional color space specified by the information about the position of lattice points in an optimized state with lattice points in the low-dimensional color space prescribed by the original correspondence defining data.

2. The system of claim 1 for determining lattice points for the correspondence defining data, in which said server has a unit to transmit data indicating lattice points for the correspondence defining data through the server's communication unit, and said client has a unit to receive data indicating lattice points for the correspondence defining data through the client's communication unit, and a unit to prepare the correspondence defining data that associates the amount of ink with the value of the color component in the specific color system by means of colorimetric values obtained by examining with a prescribed colorimeter an output of printing with an ink amount prescribed by the received data of lattice points for the correspondence defining data.

3. The system of claim 1 for determining lattice points for the correspondence defining data, in which said server has a unit to prepare the correspondence defining data that associates the amount of ink with the value of the color component in the specific color system by means of colorimetric values obtained by examining with a prescribed colorimeter an output of printing with an ink amount prescribed by data indicating lattice points for the correspondence defining data, and a unit to transmit the prepared correspondence defining data through the server's communication unit, and said client has a unit to receive the correspondence defining data through the client's communication unit.

4. A server that determines a plurality of lattice points to be referenced to prepare correspondence defining data that defines correspondence between an amount of ink for each color used by a printing apparatus and a value of a color component in a specific color system, said server comprising:

a server's communication unit to transmit and receive data through a two-way communication line, a unit to receive through the server's communication unit original correspondence defining data which previously prescribes correspondence between the lattice points in a low-dimensional color space prescribed by less color components than a number of inks for each color and the lattice points for an ink amount in an ink amount space, a unit to acquire correspondence between lattice points in the low-dimensional color space and lattice points in a device-independent color space by referencing the original correspondence defining data, a unit to prescribe a smoothness evaluation function which evaluates smoothness of an arrangement of lattice points in the device-independent color space and has as a variable information about a position of lattice points in the low-dimensional color space, the smoothness evaluation function having a minimum value when a first distance between a lattice point to be optimized and an adjacent lattice point in a first direction is equal to a second distance between the lattice point to be optimized and an adjacent lattice point in a second direction that is opposite to the first direction, and the smoothness evaluation function increasing in value as a difference between the first distance and the second distance increases, a unit to optimize the arrangement of lattice points in the device-independent color-space by improving a rating of the smoothness evaluation function, with the information about the position of lattice points varied, and a unit to determine lattice points for the correspondence defining data by associating the amount of ink for each color corresponding to lattice points in the low-dimensional color space specified by the information about the position of lattice points in an optimized state with lattice points in the low-dimensional color space prescribed by the original correspondence defining data.

5. A method for determining in a server a plurality of lattice points to be referenced to prepare correspondence defining data that defines correspondence between an amount of ink for each color used by a printing apparatus connected to a client and a value of a color component in a specific color system, in which:

said client records in a prescribed recording medium original correspondence defining data which previously prescribes correspondence between the lattice points in a low-dimensional color space prescribed by less color components than a number of inks for each color and the lattice points for an ink amount in an ink amount space and sends the original correspondence defining data to the server through a two-way communication line, and said server receives the original correspondence defining data, acquires correspondence between lattice points in the low-dimensional color space and lattice points in a device-independent color space by referencing the original correspondence defining data, prescribes a smoothness evaluation function which evaluates smoothness of an arrangement of lattice points in the device-independent color space and has as a variable information about a position of lattice points in the low-dimensional color space, the smoothness evaluation function having a minimum value when a first distance between a lattice point to be optimized and an adjacent lattice point in a first direction is equal to a second distance between the lattice point to be optimized and an adjacent lattice point in a second direction that is opposite to the first direction, and the smoothness evaluation function increasing in value as a difference between the first distance and the second distance increases, optimizes the arrangement of lattice points in the device-independent color-space by improving a rating of the smoothness evaluation function, with the information about the position of lattice points varied, and determines lattice points for the correspondence defining data by associating the amount of ink for each color corresponding to lattice points in the low-dimensional color space specified by the information about the position of lattice points in an optimized state with lattice points in the low-dimensional color space prescribed by the original correspondence defining data.

6. A method for determining a plurality of lattice points to be referenced to prepare correspondence defining data that defines correspondence between an amount of ink for each color used by a printing apparatus and a value of a color component in a specific color system, said method comprising:

acquiring through a two-way communication line original correspondence defining data which previously prescribes correspondence between the lattice points in a low-dimensional color space prescribed by less color components than a number of inks for each color and the lattice points for an ink amount in an ink amount space, acquiring correspondence between the lattice points in the low-dimensional color space and the lattice points in a device-independent color space by referencing the original correspondence defining data, prescribing a smoothness evaluation function which evaluates smoothness of an arrangement of lattice points in the device-independent color space and has as a variable information about a position of lattice points in the low-dimensional color space, the smoothness evaluation function having a minimum value when a first distance between a lattice point to be optimized and an adjacent lattice point in a first direction is equal to a second distance between the lattice point to be optimized and an adjacent lattice point in a second direction that is opposite to the first direction, and the smoothness evaluation function increasing in value as a difference between the first distance and the second distance increases, optimizing the arrangement of lattice points in the device-independent color-space by improving a rating of the smoothness evaluation function, with the information about the position of lattice points varied, and determining lattice points for the correspondence defining data by associating the amount of ink for each color corresponding to lattice points in the low-dimensional color space specified by the information about the position of lattice points in an optimized state with lattice points in the low-dimensional color space prescribed by the original correspondence defining data.

7. A computer-readable storage medium having a program for a server stored thereon, the program including computer-executable instructions for causing the server to determine a plurality of lattice points to be referenced to prepare correspondence defining data that defines correspondence between an amount of ink for each color used by a printing apparatus connected to a client and a value of a color component in a specific color system, said program permitting said client to implement a function to record original correspondence defining data which previously prescribes correspondence between the lattice points in a low-dimensional color space prescribed by less color components than a number of inks for each color and the lattice points for an ink amount in an ink amount space, and a client's communication function to transmit and receive data through a two-way communication line, and a function to transmit the original correspondence defining data to the server through the client's communication function; and said program product permitting said server to implement a server's communication function to transmit and receive data through a two-way communication line, a function to receive the original correspondence defining data through the server's communication function, a function to acquire correspondence between lattice points in the low-dimensional color space and lattice points in a device-independent color space by referencing the original correspondence defining data, a function to prescribe a smoothness evaluation function which evaluates smoothness of an arrangement of lattice points in the device-independent color space and has as a variable information about a position of lattice points in the low-dimensional color space, the smoothness evaluation function having a minimum value when a first distance between a lattice point to be optimized and an adjacent lattice point in a first direction is equal to a second distance between the lattice point to be optimized and an adjacent lattice point in a second direction that is opposite to the first direction, and the smoothness evaluation function increasing in value as a difference between the first distance and the second distance increases, a function to optimize the arrangement of lattice points in the device-independent color-space by improving a rating of the smoothness evaluation function, with the information about the position of lattice points varied, and a function to determine lattice points for the correspondence defining data by associating the amount of ink for each color corresponding to lattice points in the low-dimensional color space specified by the information about the position of lattice points in an optimized state with lattice points in the low-dimensional color space prescribed by the original correspondence defining data.

8. A computer-readable storage medium having stored thereon a program for determining a plurality of lattice points to be referenced to prepare correspondence defining data that defines correspondence between an amount of ink for each color used by a printing apparatus and a value of a color component in a specific color system, said program permitting a server computer to implement:

a server's communication function to transmit and receive data through a two-way communication line, a function to receive through the server's communication feature original correspondence defining data which previously prescribes correspondence between the lattice points in a low-dimensional color space prescribed by less color components than a number of inks for each color and the lattice points for an ink amount in an ink amount space, a function to acquire correspondence between lattice points in the low-dimensional color space and lattice points in a device-independent color space by referencing the original correspondence defining data, a function to prescribe a smoothness evaluation function which evaluates smoothness of an arrangement of lattice points in the device-independent color space and has as a variable information about a position of lattice points in the low-dimensional color space, the smoothness evaluation function having a minimum value when a first distance between a lattice point to be optimized and an adjacent lattice point in a first direction is equal to a second distance between the lattice point to be optimized and an adjacent lattice point in a second direction that is opposite to the first direction, and the smoothness evaluation function increasing in value as a difference between the first distance and the second distance increases, a function to optimize the arrangement of lattice points in the device-independent color-space by improving a rating of the smoothness evaluation function, with the information about the position of lattice points varied, and a function to determine lattice points for the correspondence defining data by associating the amount of ink for each color corresponding to lattice points in the low-dimensional color space specified by the information about the position of lattice points in an optimized state with lattice points in the low-dimensional color space prescribed by the original correspondence defining data.

* * * * *